United States Patent
Kobayashi

(10) Patent No.: US 7,286,921 B2
(45) Date of Patent: Oct. 23, 2007

(54) VEHICLE CONTROL SYSTEM FOR EXECUTING A SERIES OF PROCESSES IN ELECTRONIC CONTROL UNITS

(75) Inventor: Masayuki Kobayashi, Anjo (JP)

(73) Assignee: Denso Corporation, Kariya, Aichi-pref. (JP)

( * ) Notice: Subject to any disclaimer, the term of this patent is extended or adjusted under 35 U.S.C. 154(b) by 494 days.

(21) Appl. No.: 10/926,952

(22) Filed: Aug. 27, 2004

(65) Prior Publication Data

US 2005/0049722 A1 Mar. 3, 2005

(30) Foreign Application Priority Data

Aug. 28, 2003 (JP) .............................. 2003-304459

(51) Int. Cl.
B60R 16/02 (2006.01)
G05B 15/02 (2006.01)

(52) U.S. Cl. ....................................................... 701/48
(58) Field of Classification Search ................... 701/48
See application file for complete search history.

(56) References Cited

U.S. PATENT DOCUMENTS

| 4,853,932 A | | 8/1989 | Nitschke et al. |
| 4,945,486 A | * | 7/1990 | Nitschke et al. ............. 701/114 |
| 5,189,617 A | * | 2/1993 | Shiraishi ...................... 701/48 |
| 5,727,143 A | * | 3/1998 | Morinaga ....................... 714/3 |
| 5,895,434 A | * | 4/1999 | Fennel et al. ................. 701/48 |
| 6,445,989 B2 | * | 9/2002 | Nishimura et al. ........... 701/48 |
| 6,898,500 B2 | * | 5/2005 | Kobayashi .................... 701/48 |
| 7,047,117 B2 | * | 5/2006 | Akiyama et al. .............. 701/48 |
| 2002/0180270 A1 | | 12/2002 | Heckmann et al. |
| 2003/0018422 A1 | * | 1/2003 | Akiyama ...................... 701/48 |
| 2004/0083044 A1 | * | 4/2004 | Akiyama et al. .............. 701/48 |

FOREIGN PATENT DOCUMENTS

| JP | 1-134601 | 5/1989 |
| JP | 7-89398 | 4/1995 |
| JP | 10-214208 | 8/1998 |
| JP | 2000-339001 | 12/2000 |

* cited by examiner

Primary Examiner—Michael J. Zanelli
(74) Attorney, Agent, or Firm—Nixon & Vanderhye P.C.

(57) ABSTRACT

A series of processes is allocated to functional blocks arranged in electronic control units (ECUs) of a vehicle control system, and each functional block executes the process and outputs a signal. The first functional block receiving a value from a sensor outputs a signal including a check code of a starting state and a result of the process. Each of the other functional blocks produces a signal including a result of the process and a renewed check code based on a signal delivered by the preceding functional block. The last functional block outputs a signal to controls an actuator. A sequence check functional block of one ECU checks the deliveries of the signals designed to be performed in a predetermined order according to the renewed check code and performs error correction processing when the deliveries are performed out of the predetermined order.

24 Claims, 14 Drawing Sheets

VEHICLE CONTROL SYSTEM FOR EXECUTING A SERIES OF PROCESSES IN ELECTRONIC CONTROL UNITS

BACKGROUND OF THE INVENTION

1. Field of the Invention

The present invention relates to a vehicle control system in which a series of processes is allocated to and executed by a plurality of electronic control units (ECUs) and the series of processes is repeatedly executed to control a vehicle.

2. Description of Related Art

A conventional vehicle distributed control system has been proposed in which various functions of a vehicle such as antilock braking of an antilock brake system (ABS), engine fuel injection, ignition, reading of throttle sensor value, throttle motor driving and the like are realized by use of a plurality of ECUs. This system is, for example, disclosed in Published Japanese Patent First Publication No. 2000-339001. For communication, protocols, e.g. TTP/C (time-triggered protocol, SAE Class C), Flex-Ray and the like, have been proposed to perform time division multiplex communication among ECUs. The term "time division multiplex communication" means that one ECU communicates with another ECU at a predetermined timing which is allocated in advance to the former ECU (see, for example, Published Japanese Patent First Publication No. H07-089398).

In a vehicle distributed control system using such a time division multiplex communication as mentioned above, a series of processes that is repeatedly executed for the control of a vehicle is allocated to and executed by a plurality of functional blocks of the ECUs to divide the series of processes into a plurality of separate processes. The functional blocks are configured and arranged to repeatedly execute the series of processes to control a vehicle. Each functional block executing a corresponding separate process delivers a signal indicating a result of the separate process to another functional block by using the time division multiplex communication. Then, each functional block receiving the signal from the preceding functional block executes a corresponding separate process according to the received signal. The signals of the functional blocks are delivered in a predetermined order.

As a typical example, a vehicle control system for executing a series of processes for vehicle control in functional blocks of two ECUs is described with reference to FIG. 19 and FIG. 20. In this system, one functional block of one ECU receives a value outputted from a given sensor, and a functional block of another ECU controls a given actuator according to the value received from the former ECU.

FIG. 19 is an explanatory view showing separate processes executed in this vehicle control system. Two ECUs 161 and 162 can communicate with each other through an in-vehicle LAN (local area network) line 163 by using time division multiplex communication based on a protocol such as TTP/C, Flex-Ray or the like. A series of processes is executed in the vehicle control system according to the procedure of processes (1) to (6).

(1) A sensor 164 connected to the ECU 161 detects a predetermined physical state (including, for example, an engine speed, a vehicle speed, a position of an accelerator, an outside temperature or the like) of a vehicle, and outputs a signal indicating the detected state to the ECU 161.

(2) The ECU 161 calculates a target value of a predetermined state (for example, torque, braking or the like) of the vehicle according to the signal received from the sensor 164, and writes the calculated target value in a memory (RAM) 165 of the ECU 161. A signal flow in the processes (1) and (2) is shown in FIG. 19 by an arrow indicated by a circled numeral "1".

(3) The ECU 161 renews the target value stored in the memory 165 according to another physical state of the vehicle. A signal flow in the process (3) is shown in FIG. 19 by an arrow of a circled numeral "2".

(4) The ECU 161 transmits a signal indicating the renewed target value stored in the memory 165 to the ECU 162 through the inner-LAN line 163 at a predetermined timing allocated to the ECU 161.

(5) The ECU 162 receives the signal from the ECU 161, and writes the received target value in a memory 166. A signal flow in the processes (4) and (5) is shown in FIG. 19 by an arrow of a circled numeral "3".

(6) The ECU 162 calculates a degree of driving power and a timing of driving in an actuator 167 according to the target value written in the memory 166, and drives the actuator 167. A signal flow in the process (6) is shown in FIG. 19 by an arrow of a circled numeral "4".

This series of processes (1) to (6) can be divided into a phase (hereinafter, called phase A) of a separate process executed by the ECU 161, a phase (hereinafter, called phase B) of delivering a result of the separate process of the ECU 161 in the communication, and a phase (hereinafter, called phase C) of a separate process executed by the ECU 162. The phase A includes the processes (1), (2) and (3), the phase B includes the processes (4) and (5), and the phase C includes the process (6). Each of the phases is performed at a predetermined timing in the order of phase A, phase B and phase C.

This series of processes for controlling the vehicle is allocated to and executed by a functional block of the ECU 161 corresponding to the phase A and a functional block of the ECU 162 corresponding to the phase C. The functional block of the ECU 161 delivers a signal indicating a result of the processes of the phase A to the functional block of the ECU 162 in a predetermined order in the phase B, and the functional block of the ECU 162 executes the process of the phase C according to the signal outputted from the functional block of the ECU 161.

FIG. 20 is a timing chart showing timings at which the phase A, the phase B and the phase C for the series of processes are repeatedly performed. In FIG. 20, time passes along the right direction, and each of rectangles 181 to 191 indicates one phase. A position of each rectangle indicates a processing timing of the corresponding phase, and a width of each rectangle indicates an execution time of the process (es) of the corresponding phase. One series of processes is executed in each of a first cycle, a second cycle, a third cycle and a fourth cycle to repeatedly execute the series of processes in the cycles. In each of the first and second cycles, the series of processes are normally executed. That is, the phase B is started after completion of the processes of the phase A, and the phase C is started after completion of the processes of the phase B.

However, in the third cycle, the processes of the phase A (corresponding to the rectangle 187) are excessively loaded on the ECU 161 for some reason, and the execution time of the processes of the phase A becomes longer than that in normal operations. Therefore, a signal indicating a result of the processes of the phase A is outputted from the ECU 161 at a time later than a predetermined timing. In the fourth cycle, a signal indicating a result of the processes of the phase A is not outputted from the ECU 161 because the ECU 161 is not normally operated. In these cases, data of the memory 165 stored in the phase A (corresponding to the result of the processes outputted in the phase of the rectangle 184 or 187) is undesirably read out and transmitted to the ECU 162 in the phase B (corresponding to the phase B of the rectangle 188 or 190) Therefore, the ECU 162 works to drive the actuator 167 according to the target value not correctly set.

As described above, in the normal operation of the vehicle control system, one series of processes is allocated to a plurality of functional blocks and is repeatedly executed by the functional blocks to control a vehicle, each functional block of a current stage delivers a signal indicating a result of a separate process to another functional block of a succeeding stage in a predetermined order, and each functional block receiving the signal from another functional block of a preceding stage executes a process according to the signal. In this system, an abnormality may sometimes occur during one series of processes, and the deliveries of the signals among the functional blocks in the series of processes are not performed within given periods and performed out of a predetermined order. That is, the series of processes is not correctly executed. This abnormality is called a sequence error.

In the conventional vehicle control system, a problem arises in that the occurrence of the sequence error cannot be detected.

Published Japanese Patent First Publication No. H10-214208 teaches a technique for checking whether a plurality of applications are normally executed in a computer (for example, corresponding to a processing unit of one ECU). More particularly, a flag or counter is prepared for each application, and a monitoring unit monitors the renewal of the flag or counter for each application. Therefore, the monitoring unit can check whether or not each of the applications in the computer is normally started and completed.

However, in this technique, although the monitoring unit can check whether or not the applications in one computer are correctly executed individually, the monitoring unit cannot check whether or not a plurality of applications in a plurality of ECUs are correctly executed according to a control sequence. That is, the sequence error is not checked or detected according to this prior-art technique.

SUMMARY OF THE INVENTION

An object of the present invention is to provide, with due consideration to the drawbacks of the conventional vehicle control system, a vehicle control system which detects whether or not a series of processes executed in a plurality of ECUs is completed under a given condition.

According to a first aspect of the present invention, the object is achieved by the provision of a vehicle control system comprising a plurality of electronic control units which execute a series of processes under a given condition and which each have at least one functional block, and a detector which detects whether or not the series of processes has been completed under the given condition by the functional blocks of the electronic control units and outputs a detection result. Each of the functional blocks executes one of the processes and outputs a signal including a result of the process. A first one of the functional blocks in the execution of the series of processes receives an input and executes the process using the input. Each of the functional blocks subsequent to the first one executes the process using the signal delivered by a preceding one of the functional blocks. A last one of the functional blocks in the execution of the series of processes outputs the signal for use in vehicle control.

When a sequence error or an abnormality occurs during operations of the functional blocks, the series of processes is not completed under the given condition by the functional blocks. In this case, functional elements of a vehicle cannot be normally operated under the control of the vehicle control system. However, in the present invention, the detector detects that the series of processes has not been completed under the given condition by the functional blocks of the electronic control units and outputs a detection result. Accordingly, the vehicle control system can immediately perform error correction processing according to the detection result, and the functional elements of the vehicle can be normally operated under the control of the vehicle control system.

Preferably, the deliveries of the signals of the functional blocks are designed to be performed in a predetermined order, and the detector which detects whether or not the deliveries of the signals have been performed in the predetermined order and outputs the detection result.

When a sequence error or an abnormality occurs during operations of the functional blocks, the deliveries of the signals of the functional blocks is performed out of the predetermined order. Because each functional block executes an intended process, the detector can easily detect that the deliveries of the signals of the functional blocks are performed out of the predetermined order. Based on this detection, the vehicle control system can appropriately perform error correction processing.

Preferably, a specific functional block or each of a plurality of specific functional blocks denoting a part of the functional blocks or all the functional blocks processes order check information received from one preceding functional block and outputs a signal including both the order check information processed and the result of the process to one succeeding functional block. Each of the functional blocks other than the specific functional blocks outputs a signal including both the order check information received from one preceding functional block and the result of the process to one succeeding functional block. The detector detects whether or not the deliveries of the signals of the specific functional blocks are performed in the predetermined order according to the order check information of the signal outputted from one of the functional blocks.

When a sequence error does not occur, each specific functional block delivers a signal including both the order check information processed and the result of the process in the predetermined order. Therefore, the detector can detect the deliveries of the signals performed in the predetermined order according to the order check information. When a sequence error occurs, at least one specific functional block does not deliver the signal in the predetermined order. Therefore, the detector can detect the deliveries of the signals performed out of the predetermined order according to the order check information.

It is preferred that the functional blocks including an intended functional block repeatedly execute the series of processes, the detector receives the order check information from the intended functional block for each series of processes, the detector calculates a difference between the order check information received in a preceding series of processes and the order check information received in a current series of processes, and the detector judges that the deliveries of the signals of the functional blocks are performed out of the predetermined order when the difference is not equal to a predetermined difference.

When each specific functional block changes the order check information for each series of processes, the order check information outputted from the intended functional block to the detector is normally changed by a predetermined difference for each series of processes. Therefore, the difference in the order check information between the preceding series of processes and the current series of processes is equal to the predetermined difference in case of no occurrence of a sequence error. On the other hand, the difference is not equal to the predetermined difference in case of the occurrence of a sequence error. In this way, the detector is able to judge that the deliveries of the signals of the functional blocks are performed out of the predetermined order.

It is also preferred that the detector calculates a difference between the order check information outputted from the functional block first delivering the signal in the predetermined order and the order check information outputted from the functional block delivering the signal at the last but one in the predetermined order, and the detector judges that the deliveries of the signals of the specific functional blocks are performed out of the predetermined order when the difference is not equal to a predetermined difference.

Because the judgment of the detector is based on the order check information outputted from the functional block first delivering the signal and the order check information outputted from the functional block delivering the signal at the last but one, the detector can judge that the deliveries of the signals of all the specific functional blocks are performed out of the predetermined order.

It is also preferred that the order check information has a plurality of flags, and each specific functional block sets one or more flags at a predetermined state.

Therefore, the detector can detect one specific functional block in which the signal is delivered out of the predetermined order.

It is also preferred that the specific functional blocks are classified into a plurality of groups, a difference between the received order check information and the processed order check information in the specific functional block(s) of each group differs from a difference between the received order check information and the processed order check information in the specific functional block(s) of each of the other group(s).

Therefore, the detector can detect one group in which the signal is delivered out of the predetermined order.

Preferably, the functional block first delivering the signal in the predetermined order comprises a storing part which produces starting information each time the functional block delivers the signal and stores the starting information in a recording medium, a reading-out part which reads out the starting information stored in the recording medium by the storing part, a setting part which sets the starting information read out by the reading-out part as the order check information set at the starting state, an outputting part which outputs the order check information set by the setting part, and a process part which executes a first part of the process during a time period between the storage of the starting information performed by the storing part and the reading of the starting information performed by the reading-out part and executes a second part of the process during a time period between the reading of the starting information performed by the reading-out part and the setting of the order check information performed by the setting part.

Therefore, the possibility of detecting an error locally occurring in the functional block first delivering the signal in the predetermined order can be heightened.

Preferably, all the functional blocks including one specific functional block or one or more functional blocks including one specific functional block, respectively, execute a plurality of second processes. These second processes are determined by dividing a second type series of processes in the same manner as the processes for the series of processes, and the specific functional block receives second order check information for the second type series of processes in addition to the order check information for the series of processes, processes the order check information or the second order check information corresponding to the series of processes or the second type series of processes required to be processed at a higher degree of reliability, and outputs the order check information or the second order check information processed.

Therefore, when a plurality of types series of processes are executed in the vehicle control system, the delivered signals can be simplified.

According to a second aspect of the present invention, the object is achieved by the provision of a vehicle control system comprising a plurality of electronic control units which repeatedly execute a series of processes to control a vehicle, and an order check unit arranged in one of the electronic control units. Each of the electronic control units executes one of the processes for each series of processes and outputting a signal in communication using a communication line. A first one of the electronic control units in execution of each series of processes receives an input and outputs the signal including check data and a result of the process using the input. Each of the electronic control units subsequent to the first one renews the check data so as to indicate completion of execution of the process in the check data, executes the process using the signal delivered by a preceding one of the functional blocks and outputs the signal including both the check data renewed and a result of the process. A last one of the electronic control units in the execution of each series of processes outputs the signal for use in vehicle control. Deliveries of the signals among the electronic control units are designed to be performed in a predetermined order for each series of processes. The order check unit compares the check data delivered to the electronic control unit of the order check unit in a current series of processes with the check data delivered to the electronic control unit in a series of processes preceding to the current series of processes, judges according to a comparison result whether or not the deliveries of the signals of the electronic control units have been performed in the predetermined order and outputs a judgment result.

Because the order check unit judges whether or not the deliveries of the signals of the electronic control units are performed in a predetermined order, functional elements of a vehicle can be normally operated under the control of the vehicle control system.

DETAILED DESCRIPTION OF THE PREFERRED EMBODIMENTS

Figure 1:
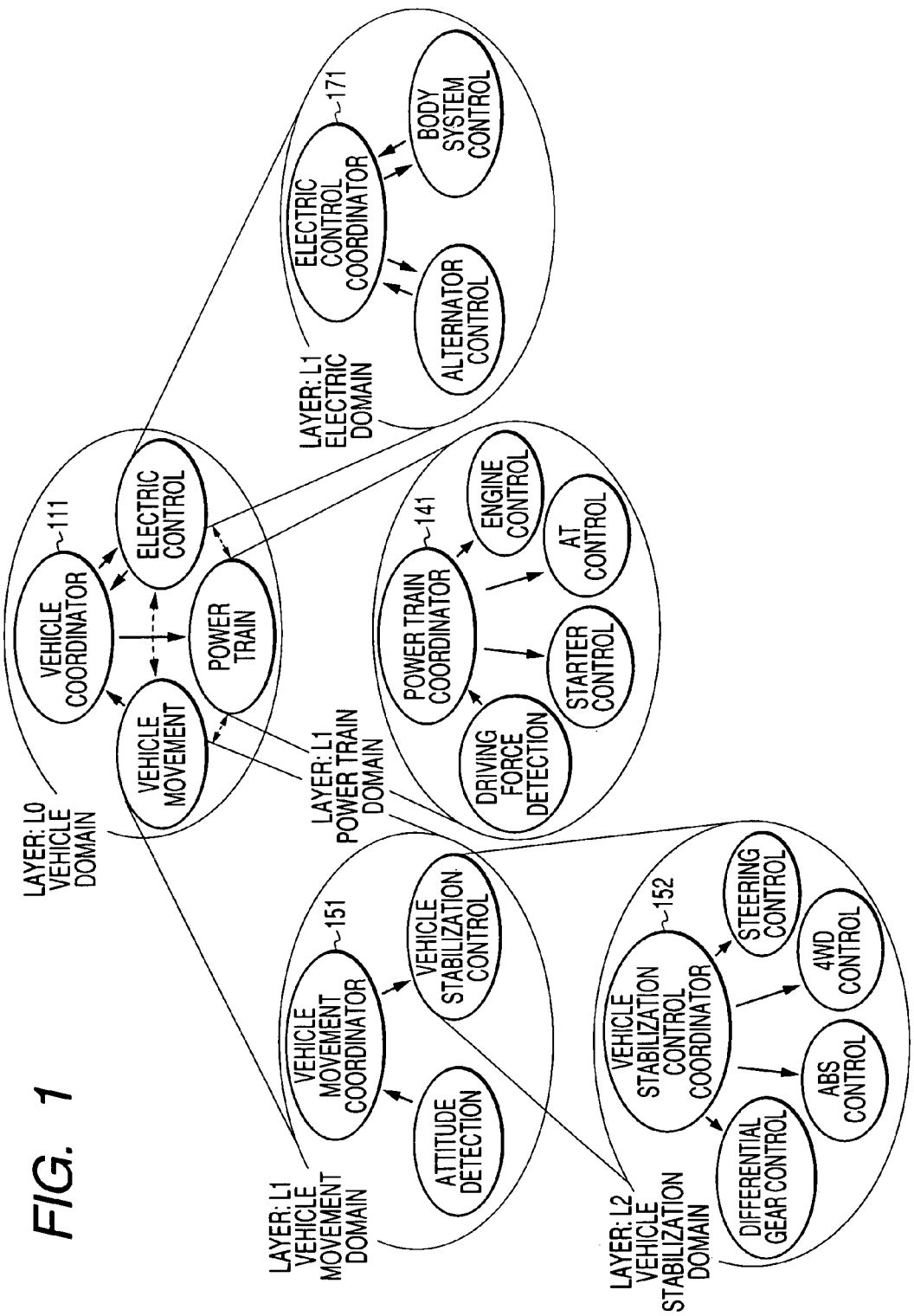
FIG. 1 is a view conceptually showing a hierarchical structure of a plurality of control operations in a vehicle control system according to the first to sixth embodiments of the present invention.

Embodiments of the present invention will now be described with reference to the accompanying drawings, in which like reference numerals indicate like parts, members or elements throughout the specification unless otherwise indicated.

First Embodiment

FIG. 1 is a view conceptually showing a hierarchical structure of a plurality of control operations in a vehicle control system according to an embodiment of the present invention.

A vehicle has a plurality of functional elements such as an engine, a transmission, a clutch, a starter, an alternator, an ABS, a differential gear, 4WD (four-wheel drive) and the like.

As shown in FIG. 1, functions of the vehicle are broadly classified into three categories including vehicle movement, power train and electric control. The engine, the transmission, the clutch and the starter belong to the vehicle movement. The ABS, the differential gear and the 4WD belong to the power train. The alternator belongs to the electric control. A vehicle coordinator 111 coordinates the functions of the vehicle movement, the power train and the electric control in a vehicle domain of a layer L0 (level "0"). In detail, the vehicle coordinator 111 obtains information of the functions of the vehicle movement, the power train and the electric control from a plurality of electronic control units (ECUs) of the vehicle movement, the power train and the electric control, thereby determining a control plan of the vehicle as a whole according to the thus obtained information. Based on the control plan, instructions of operation are outputted to the ECUs of the vehicle movement, the power train and the electric control, respectively. The control plan includes, for example, a target torque of an axle shaft or the like.

The respective functions of the vehicle movement, the power train and the electric control are further classified into sub-functions. That is, the functions of the vehicle are hierarchically classified.

The function of the electric control is, for example, classified into two sub-functions of alternator control and body system control. An electric control coordinator 171 serves to coordinate the sub-functions of the alternator control and the body system control in an electric domain of a layer L1. More particularly, the electric control coordinator 171 receives information of a supplied current from an ECU of the alternator control, receives information of operations of body system units from an ECU of the body system control and also receives instructions indicating an upper limit of an alternator current and the like from the vehicle coordinator 111. Then, the electric control coordinator 171 transmits instructions of operation according to the received information and instructions to the ECUs of the alternator control and the body system control. It will be noted that the term "body system control" is intended to generally mean the controls of power window, wipers, air conditioner, door lock and the like.

The function of the power train is, for example, classified into four sub-functions of engine control, automatic transmission (AT) control, starter control and driving force detection. A power train coordinator 141 coordinates the sub-functions of the engine control, AT control, starter control and driving force detection in a power train domain of the layer L1. More particularly, the power train coordinator 141 receives information of an axle torque from an ECU of the driving force detection and receives instructions of a target axle torque and the like from the vehicle coordinator 111. Thereafter, the power train coordinator 141 outputs instructions of fuel injection, ignition, gear shift, starter on/off and the like according to the received information and instructions to ECUs of the engine control, the AT control and the starter control.

The function of the vehicle movement is, for example, classified into two sub-functions of attitude detection and vehicle stabilization control. A vehicle movement coordinator 151 coordinates the sub-functions of the attitude detection and the vehicle stabilization control in a vehicle movement domain of the layer L1. More particularly, the vehicle movement coordinator 151 receives information of vehicle speed, yaw rate, straight line acceleration, lateral acceleration and the like from an ECU of the attitude detection, and receives instructions from the vehicle coordinator 111. Thereafter, the vehicle movement coordinator 151 outputs an instruction of target tire force (denoting force applied to tires) according to the received information and instructions to an ECU of the vehicle stabilization control.

Further, the vehicle movement coordinator 151, the power train coordinator 141 and the electric control coordinator 171 of the layer L1, respectively, output information of the vehicle movement domain, information of the power train domain and information of the electric control domain to the vehicle coordinator 111 of the layer L0 (i.e., a superordinate coordinator).

The function of the vehicle stabilization control of the vehicle movement domain can be further classified into sub-functions of steering control, 4WD control, ABS control and differential gear control. A vehicle stabilization control coordinator 152 coordinates these four sub-functions of the steering control, 4WD control, ABS control and differential gear control in a vehicle stabilization control domain of a layer L2. More specifically, the vehicle stabilization control coordinator 152 receives an instruction from the vehicle movement coordinator 151 and outputs an instruction produced from the received instruction to each of ECUs of the steering control, 4WD control, ABS control and differential gear control.

The hierarchy of the functions of the vehicle shown in FIG. 1 is an example of a function classification method, and the classification of the functions according to the present invention should not be construed as limiting to the hierarchy of the functions shown in FIG. 1. For example, the body system control is not subordinated to the electric control coordinator 171, but may be subordinated to a body system coordinator.

Figure 2:
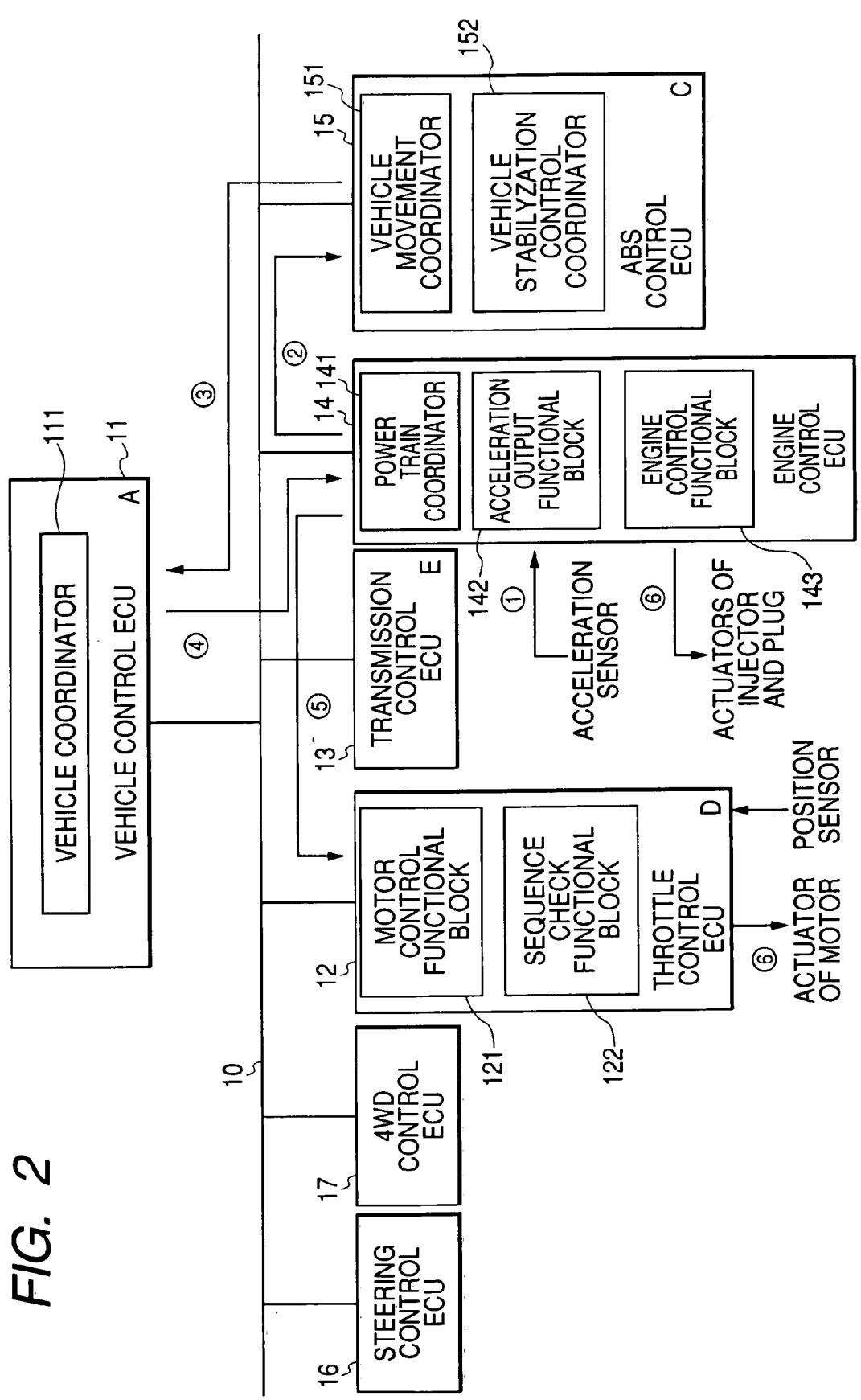
FIG. 2 is a block diagram showing an arrangement of an in-vehicle communication network realizing the vehicle control system according to the first to sixth embodiments of the present invention.

FIG. 2 is a block diagram showing an arrangement of an in-vehicle communication network realizing the vehicle control system according to this invention. This in-vehicle communication network has a serial communication line 10, a vehicle control ECU 11 having the vehicle coordinator 111, a throttle control ECU 12 having one or more process functional blocks (for example, a motor control functional block 121) of throttle control and a sequence check functional block 122 (corresponding to a detector and an order check unit), a transmission control ECU 13 having one or more process functional blocks of the AT control, an engine control ECU 14 having the power train coordinator 141 and one or more process functional blocks (for example, an acceleration output functional block 142 and an engine control functional block 143) of the engine control, an ABS control ECU 15 having the vehicle movement coordinator 151, the vehicle stabilization control coordinator 152 and one or more process functional blocks of the ABS control, a steering control ECU 16 having one or more process functional blocks of the steering control, a 4WD control ECU 17 having one or more process functional blocks of the 4WD control, and other ECUs (not shown) corresponding to the attitude detection, the differential gear control, the driving force detection, the starter control, the alternator control and the body system control.

The ECUs 11 to 17 receive and transmit communication data from/to each other through the serial communication line 10. That is, each ECU is connected to the communication network as a node.

Figure 3:
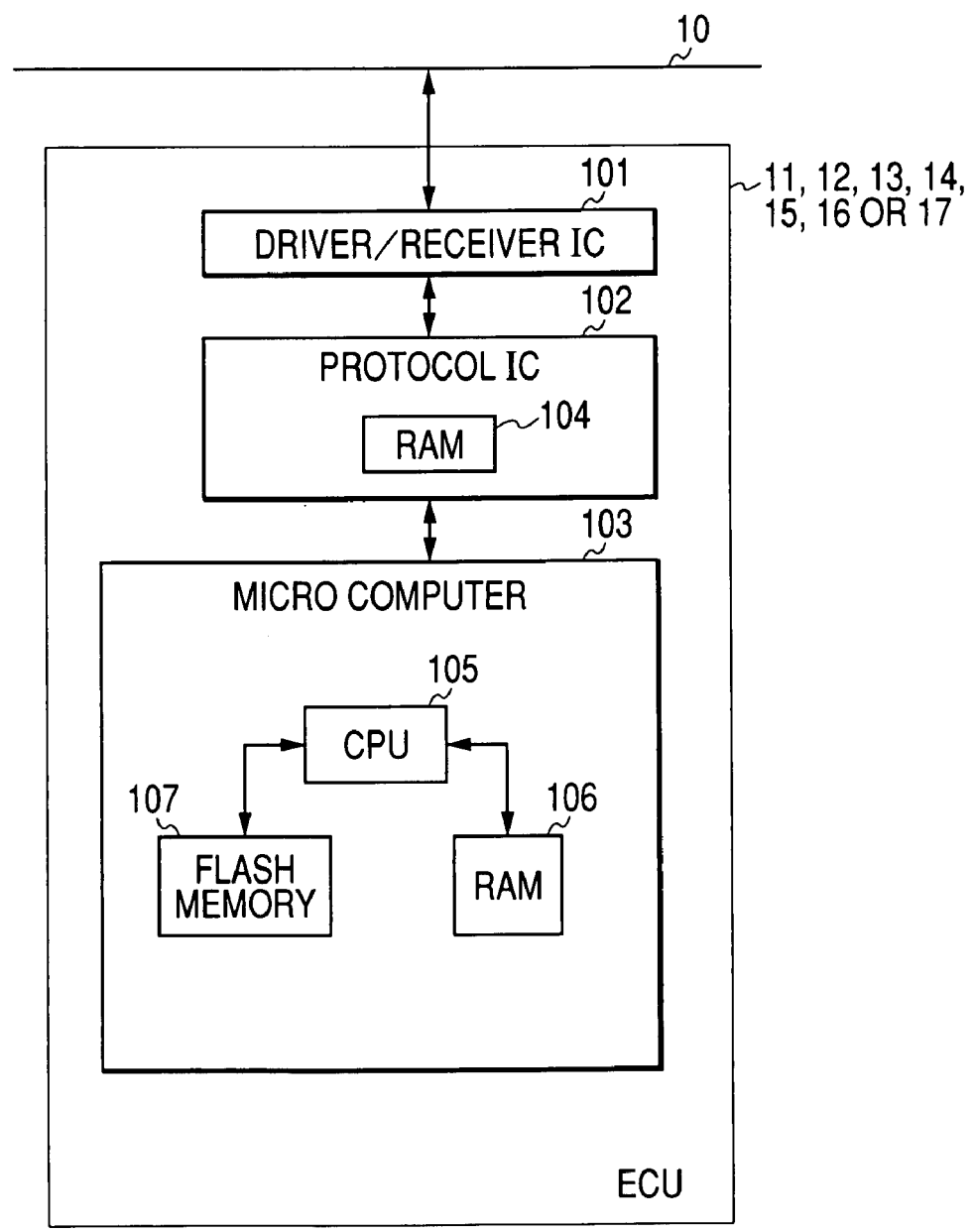
FIG. 3 is block diagram showing a fundamental structure common to all ECUs of the vehicle control system according to the first to sixth embodiments of the present invention.

Each ECU has a fundamental structure common to all the ECUs 11 to 17. FIG. 3 is block diagram showing a fundamental structure common to all the ECUs 11 to 17 of the vehicle control system.

As shown in FIG. 3, each of the ECUs 11 to 17 has a driver/receiver integrated circuit (IC) 101, a protocol IC 102, and a microcomputer 103. The vehicle coordinator 111 is realized by the microcomputer 103 of the vehicle control ECU 11. The power train coordinator 141 is realized by the microcomputer 103 of the engine control ECU 14. The vehicle movement coordinator 151 and the vehicle stabilization control coordinator 152 are realized by the microcomputer 103 of the ABS control ECU 15, respectively.

The driver/receiver IC 101 selects an electric signal outputted to the serial communication line 10 at a predetermined timing from a plurality of electric signals of the serial communication line 10, and converts the selected electric signal into digital data processible in the ECU, followed by outputting the digital data to the protocol IC 102. Further, the driver/receiver IC converts digital data received from the protocol IC 102 into an electric signal suitable to physical characteristics of the serial communication line 10, and outputs the electric signal to the serial communication line 10.

The protocol IC 102 has a random access memory (RAM) 104. The protocol IC 102 writes digital data received from the driver/receiver IC 101 in a predetermined area of the RAM 104. When the protocol IC 102 receives a read-out request for data stored in a predetermined area of the RAM 104 from the microcomputer 103, the protocol IC 102 outputs the data stored in the predetermined area of the RAM 104 to the microcomputer 103.

When the protocol IC 102 receives data from the microcomputer 103, the protocol IC 102 executes the processing of a frame format in which an identifier (ID) and codes of cyclic redundancy check (CRC) are added to the data to produce processed data suitable to a communication protocol used in this in-vehicle communication network. In this embodiment, a protocol such as TTP/C, Flex-Ray or the like is used as a communication protocol to perform the time division multiplex communication through the serial communication line 10. In the time division multiplex communication, a timing for outputting data from one ECU to the serial communication line 10 is determined in advance for each ECU. The protocol IC 102 of each ECU outputs transmission data to the driver/receiver IC 101 at a timing determined for the ECU.

The microcomputer 103 has a central processing unit (CPU) 105, an RAM 106 made of a rewritable volatile memory, and a flash memory 107 made of a rewritable nonvolatile memory. The flash memory 107 stores a plurality of programs of software and data required to execute the programs. The CPU 105 executes various processes by reading out each program and data from the flash memory 107 and executing the program, and writes data indicating a result of each process in the RAM 106. When communication with another ECU is required, the CPU 105 outputs data to the protocol IC 102 to output the data from the protocol IC 102 to the serial communication line 10 through the driver/receiver IC 101.

In particular, the execution of each program in the CPU 105 is started at a predetermined timing. The CPU 105 can execute a first group of programs for a first process and execute a second group of programs for a second process. The CPU 105 can use a result of the first process for the execution of the second process by performing inter-process communication or writing and reading out the result of the first process in/from the flash memory 107.

The above-described configuration of the fundamental structure is common to all the ECUs 11 to 17. In addition to the fundamental structure, a program or a plurality of programs based on the functions of each ECU are stored in the flash memory 107 of the ECU, and the CPU 105 of each ECU receives and transmits signals from/to a functional element or a plurality of functional elements such as a sensor, an actuator and the like relating to the functions of the ECU to perform the control functions of the ECU.

As an example, the flash memory 107 of the vehicle control ECU 11 additionally stores a program(s) for realizing the function of the vehicle coordinator 111.

The throttle control ECU 12 is connected to a position sensor which detects a position of a throttle valve, and a motor which controls the position of the throttle valve. The throttle control ECU 12 receives a detection signal from the position sensor and outputs a control signal based on the received signal to the motor. The flash memory 107 of the throttle control ECU 12 additionally stores a program(s) for realizing a function (called a motor control function) of controlling the motor. The CPU 105 of the throttle control ECU 12 executes the programs according to a signal transmitted from the power train coordinator 141 of the engine control ECU 14 to realize the motor control function.

The CPU 105 of the transmission control ECU 13 executes a program(s) for controlling the transmission.

The engine control ECU 14 is connected to an acceleration sensor which detects a position of an accelerator, an injector which injects fuel, and a plug for ignition. The engine control ECU 14 receives a detection signal from the acceleration sensor, and outputs control signals based on the received signal to the injector and the plug, respectively. The flash memory 107 of the engine control ECU 14 additionally stores a program(s) for realizing a function (called an acceleration output function) of outputting the detection signal of the acceleration sensor to the vehicle stabilization control coordinator 152, a program(s) for realizing a function (called an engine control function) of controlling the fuel injection of the injector and the ignition of the plug according to the instruction received from the power train coordinator 141, and a program(s) for realizing the function of the power train coordinator 141. The CPU 105 of the engine control ECU 14 executes these programs.

The flash memory 107 of the ABS control ECU 15 additionally stores a program(s) for realizing a function of the vehicle movement coordinator 151 and a program(s) for realizing a function of the vehicle stabilization control coordinator 152. The CPU 105 of the ABS control ECU 15 executes these programs.

A series of processes repeatedly executed to control a vehicle is described in detail as an example. In each series of processes, a control for the vehicle as a whole is determined according to a detection signal of the acceleration sensor and the like, and operations of the motor, the injector and the plug are controlled under the determined control.

Each series of processes is allocated to functional blocks. That is, process functional blocks of the ECUs to divide the series of processes into a plurality of separate processes, and each of the process functional blocks executes one separate process and outputs a signal. A first process functional block in the execution of the series of processes receives a value from a sensor and outputs a signal based on the value at a predetermined timing (or a given condition). Each of the other process functional blocks executes one separate process at a predetermined timing (or a given condition) according to a signal of a preceding process functional block and delivers a signal indicating a result of the separate process to a succeeding process functional block. A last process functional block in the execution of the series of processes outputs a signal for use in vehicle control. The signals of the process functional blocks are so designed to be delivered in a predetermined order.

In the data transmission performed in the data delivery between two process functional blocks of different ECUs, the process functional block of the ECU of a data sending side outputs data to the protocol IC 102 of the data sending ECU to generate processed data suitable for the communication protocol from the data, the protocol IC 102 outputs the processed data to the driver/receiver IC 101 of the data sending ECU, and the driver/receiver IC 101 outputs the processed data to the serial communication line 10 at a predetermined timing.

In the data reception performed in the data delivery between two process functional blocks of different ECUs, the driver/receiver IC 101 of the ECU of a data receiving side receives data outputted to the serial communication line 10 at a predetermined timing and outputs the data to the protocol IC 102 of the data receiving ECU, and the protocol IC 102 writes the data in a predetermined area of the RAM 106 thereof. Thereafter, the microcomputer 103 of the data receiving ECU outputs a request for the data to the protocol IC 102 and receives the data stored in the RAM 106.

Figure 4:
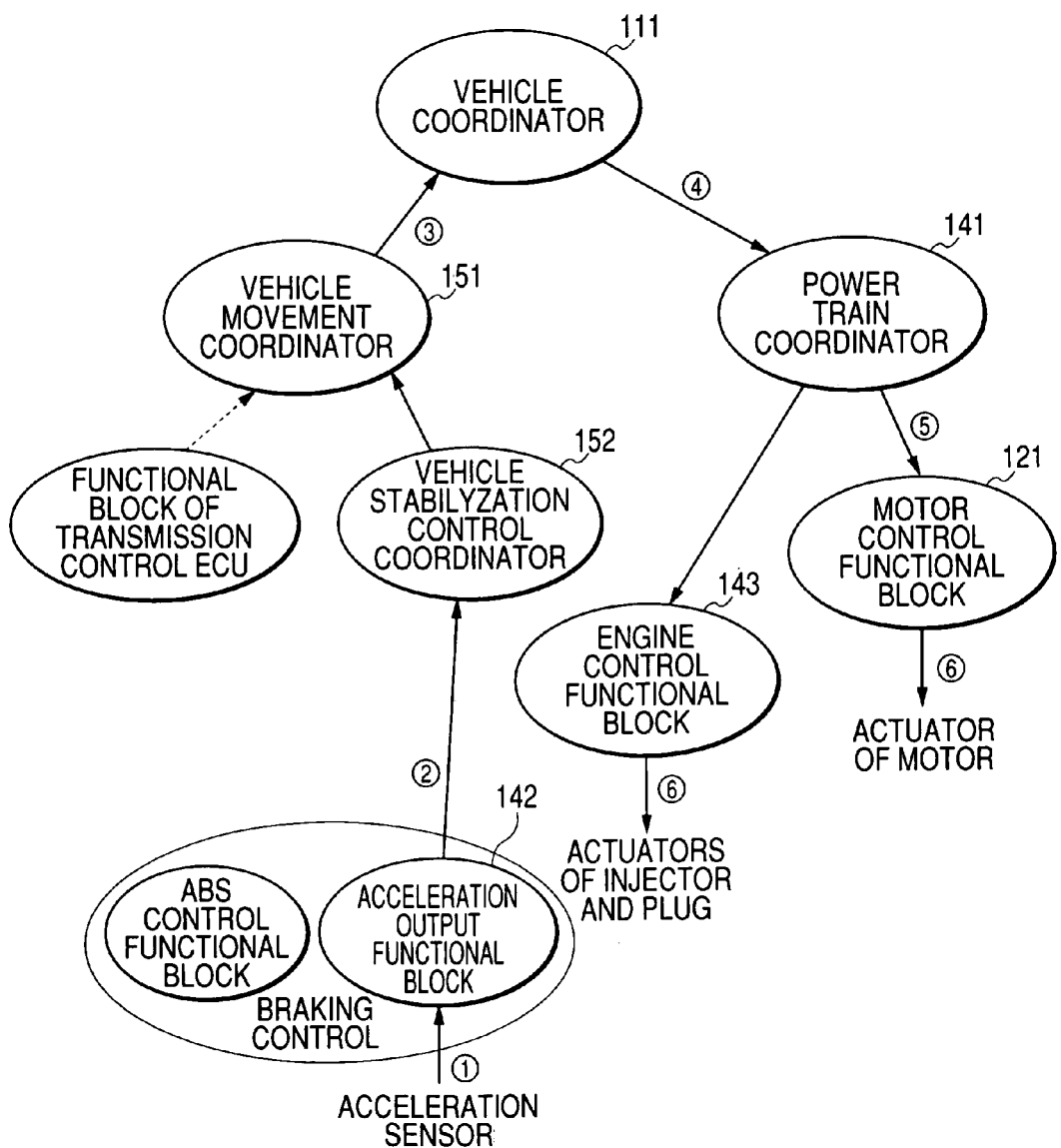
FIG. 4 is a view visually showing a flow of a plurality of separate processes allocated to and executed by process functional blocks of the ECUs of the vehicle control system according to the first to fourth embodiments of the present invention.

A flow of a plurality of separate processes executed by process functional blocks of the ECUs of the vehicle control system is visually shown in FIG. 4. In FIG. 4, the acceleration output functional block 142 of the engine control ECU 14 realizing the acceleration output function reads a detection signal (for example, a voltage value A/D-converted) sent from the acceleration sensor (indicated by circled numeral "1" in FIG. 4), rounds down the voltage value according to the required precision or the reliability of the voltage value, and outputs the rounded value to the protocol IC 102 of the engine control ECU 14 as data indicating a result of the separate process. This acceleration output functional block 142 addresses the data to the vehicle movement coordinator 151 of the ABS control ECU 15. Next, the protocol IC 102 outputs the data to the serial communication line 10 through the driver/receiver IC 101.

In this embodiment, the A/D-converted value is expressed by 12 bits, and the reliability of the voltage value is at 10 bits for example. In this case, the lower two bits of the voltage value are discarded to obtain the rounded value.

The data outputted to the serial communication line 10 is received by the vehicle stabilization control coordinator 152 (that is, the microcomputer 103 of the ABS control ECU 15) through the driver/receiver IC 101 and the protocol IC 102 of the ABS control ECU 15 (indicated by circled numeral "2" in FIG. 2 and FIG. 4). The vehicle stabilization control coordinator 152 delivers the received data to the vehicle movement coordinator 151 as a signal indicating the result of the separate process executed by the engine control ECU 14. Because the vehicle movement coordinator 151 is realized by the same microcomputer 103 as that of the vehicle stabilization control coordinator 152, the delivery of the signal between the vehicle stabilization control coordinator 152 and the vehicle movement coordinator 151 is performed by using the inter-process communication or the flash memory 107 as described above, and no signal passes through the serial communication line 10 in this delivery.

When the vehicle movement coordinator 151 receives the data, the vehicle movement coordinator 151 delivers the received data to the vehicle coordinator 11 of the vehicle control ECU 11 as a signal indicating the result of the separate process executed by the engine control ECU 14 (indicated by circled numeral "3" in FIG. 2 and FIG. 4) More particularly, because the vehicle movement coordinator 151 is realized by the microcomputer 103 of the ABS control ECU 15 different from the vehicle control ECU 11, the vehicle movement coordinator 151 addresses the data to the vehicle coordinator 111 of the vehicle control ECU 11 and outputs the data to the protocol IC 102 of the ABS control ECU 15. Subsequently, the protocol IC 102 outputs the data to the serial communication line 10 through the driver/receiver IC 101. The data outputted to the serial communication line 10 is received by the vehicle coordinator 111 through the driver/receiver IC 101 and the protocol IC 102 of the vehicle control ECU 11.

The vehicle coordinator 111 calculates a value of engine torque required by the whole vehicle according to the data detected by the acceleration sensor and other received detection data of sensors such as a brake sensor, a steering sensor and the like. Thereafter, the vehicle coordinator 111 outputs data of a calculated target value of the engine torque to the power train coordinator 141 as a signal indicating a result of the separate process executed by the vehicle coordinator 111 (indicated by circled numeral "4" in FIG. 2 and FIG. 4).

Because the power train coordinator 141 is realized by the microcomputer 103 of the engine control ECU 14 different from the vehicle control ECU 11, the vehicle coordinator 111 addresses the data of the calculated target value to the power train coordinator 141 of the engine control ECU 14 and outputs the data to the protocol 102 of the vehicle control ECU 11. The protocol 102 outputs the data to the serial communication line 10 through the driver/receiver IC 101. The data outputted to the serial communication line 10 is received by the power train coordinator 141 through the driver/receiver IC 101 and the protocol IC 102 of the engine control ECU 14.

The power train coordinator 141 calculates an amount of fuel injected by means of an injector, an ignition timing of a plug and a target amount of intake air according to the received target value of the engine torque. Then, the power train coordinator 141 addresses data of the target amount of intake air to the motor control functional block 121 of the throttle control ECU 12 realizing the motor control function, and outputs the data to the protocol IC 102 of the engine control ECU 14 as a signal indicating a result of the separate process. The protocol IC 102 outputs the data to the serial communication line 10.

Further, the power train coordinator 141 delivers data of the amount of fuel and the ignition timing to the engine control functional block 143 of the engine control ECU 14 realizing the engine control function as a signal indicating a result of the separate process.

When the engine control functional block 143 receives the data of the amount of fuel and the ignition timing by using the inter-process communication or the flash memory 107, the engine control functional block 143 outputs a control signal based on the data to the injector and the plug (indicated by circled numeral "6" in FIG. 2 and FIG. 4).

When the motor control functional block 121 of the throttle control ECU 12 receives the data of the target amount of intake air through the serial communication line 10 (indicated by circled numeral "5" in FIG. 2 and FIG. 4), the motor control functional block 121 outputs a control signal based on the data to a motor to operate the motor in synchronization with operations of the injector and the plug (indicated by circled numeral "6" in FIG. 2 and FIG. 4).

In the series of processes described above, the target engine torque is determined according to the detection signals of the acceleration sensor, the brake sensor and the like, actuators of the motor, the injector and the plug are controlled to set the engine torque at the target value. In this series of processes, the acceleration output functional block 142, the vehicle stabilization control coordinator 152, the vehicle movement coordinator 151, the vehicle coordinator 111 and the power train coordinator 141 are operated one after another in that order. A signal indicating a result of the separate process obtained in a current functional block is delivered to a succeeding functional block. The motor control functional block 121 and the engine control functional block 143 subordinated by the power train coordinator 141 together are operated in parallel to each other.

In the serial communication line 10, the time division multiplex communication is performed among the ECUs, and each ECU can output data to the serial communication line 10 at a timing allocated in advance to communicate with another ECU.

Figure 5:
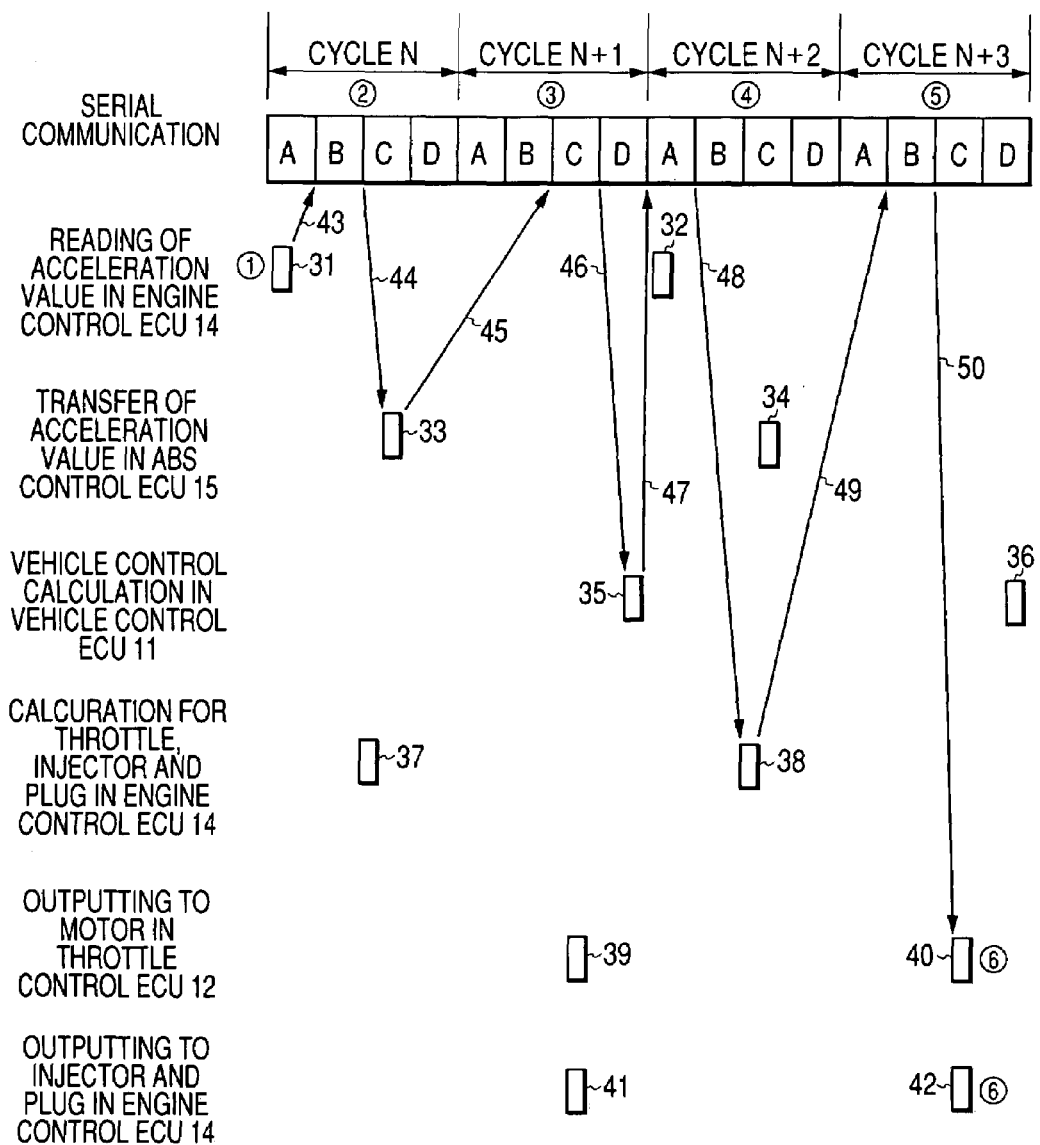
FIG. 5 is a timing chart showing timings at which signals indicating results of processes serially executed are delivered in time division multiplex communication according to the first to fourth embodiments of the present invention.

FIG. 5 is a timing chart showing timings at which signals are delivered in time division multiplex communication. In FIG. 5, time passes along the right direction as viewing in this figure. Each of rectangles 31 to 42 indicates a separate process of the series of processes shown in FIG. 4. A width of each process in the right direction denotes a processing time. Each of arrows 43 to 50 indicates a timing of data received or transmitted between the process functional blocks.

In the time division multiplex communication, the timing for outputting data from each of the ECUs 11 to 17 to the serial communication line 10 is predetermined. In this embodiment, as shown in FIG. 5, time is divided into cycles having a fixed time of period together. Each cycle is divided into four time slots A, B, C and D.

The vehicle control ECU 11 can output data to the serial communication line 10 at the timing of the slot A. The engine control ECU 14 can output data to the serial communication line 10 at the timing of the slot B. The ABS control ECU 15 can output data to the serial communication line 10 at the timing of the slot C. The throttle control ECU 12 can output data to the serial communication line 10 at the timing of the slot D. The present invention should not be construed as limiting to the slots A to D. For example, each cycle may be divided into five time slots A to E, and the transmission control ECU 13 may be set to output data to the serial communication line 10 at the timing of the slot E.

The timing for receiving data outputted to the serial communication line 10 in the driver/receiver IC 101 and the protocol IC 102 is predetermined for each ECU.

In the timing chart of FIG. 5, a current series of processes 31, 33, 35, 38, 40 and 42 (the processes 40 and 42 are simultaneously executed) is executed during the four cycles N to N+3, a preceding series of processes including the processes 37, 39 and 41 is executed during the two cycles N and N+1 and two cycles preceding the cycle N, and a succeeding series of processes including the processes 32, 34 and 36 are executed during the two cycles N+2 and N+3 and two cycles subsequent to the cycle N+3. The execution of the preceding series is earlier than the current series by two cycles, and the execution of the succeeding series is later than the current series by two cycles. Each of the current series, the preceding series and the succeeding series is identical with the series of processes shown in FIG. 4. The series of processes 37, 39 and 41 of the preceding series corresponds to a latter part of the series of processes shown in FIG. 4, and processes of the preceding series corresponding to a first part of the series of processes shown in FIG. 4 are not shown in FIG. 5. The processes 32, 34 and 36 of the succeeding series corresponds to a first part of the series of processes shown in FIG. 4, and processes of the succeeding series corresponding to a latter part of the series of processes shown in FIG. 4 are not shown in FIG. 5. Therefore, a series of processes are repeatedly executed, and one series of processes overlaps with another series of processes along a time axis. The present invention should not be construed as limiting to a series of processes repeatedly executed while overlapping with each other, and a series of processes may be repeatedly executed without overlapping with each other along the time axis.

The current series of processes 31, 33, 35, 38, 40 and 42 representing one series of processes is described below. In the N-th cycle, the acceleration output functional block 142 of the engine control ECU reads data from the acceleration sensor in the process 31 and outputs the data to the protocol IC 102, and the protocol IC 102 outputs the received data to the serial communication line 10 through the driver/receiver IC 101 at a timing of the slot B of the N-th cycle (indicated by the arrow 43).

Thereafter, the protocol IC 102 of the ABS control ECU 15 receives the data outputted to the serial communication line 10 at the timing of the slot B and writes the data in the RAM 104 thereof (indicated by the arrow 44). Thereafter, in the process 33, the vehicle stabilization control coordinator 152 of the microcomputer 103 of the ABS control ECU 15 obtains the data of the RAM 104 and delivers the data to the vehicle movement coordinator 151 operable in the same microcomputer 103, and the vehicle movement coordinator 151 outputs the data to the protocol IC 102. The protocol IC 102 outputs the received data to the serial communication line 10 through the driver/receiver IC 101 at a timing of the slot C of the (N+1)-th cycle (indicated by the arrow 45).

Thereafter, the protocol IC 102 of the vehicle control ECU 11 receives the data outputted to the serial communication line 10 at the timing of the slot C and writes the data in the RAM 104 thereof (indicated by the arrow 46). In the process 35, the vehicle coordinator 111 of the microcomputer 103 of the vehicle control ECU 11 outputs data of a target torque value based on the data of the RAM 104 to the protocol IC 102. The protocol IC 102 outputs the received data to the serial communication line 10 through the driver/receiver IC 101 at a timing of the slot A of the (N+2)-th cycle (indicated by the arrow 47).

Thereafter, the protocol IC 102 of the engine control ECU 14 receives the data of the target torque value outputted to the serial communication line 10 at the timing of the slot A and writes the data in the RAM 104 thereof (indicated by the arrow 48). In the process 38, the power train coordinator 141 of the microcomputer 103 of the engine control ECU 14 calculates data of a target amount of intake air, a target amount of fuel injection and a timing of ignition from the data of the target torque value, and outputs data of the target amount of intake air, data of the target amount of fuel injection and data of the timing of ignition to the protocol IC 102. The protocol IC 102 outputs the received data of the target amount of intake air to the serial communication line 10 through the driver/receiver IC 101 at a timing of the slot B of the (N+3)-th cycle (indicated by the arrow 49).

Thereafter, the protocol IC 102 of the throttle control ECU 12 receives the data of the target amount of intake air outputted to the serial communication line 10 at the timing of the slot B and writes the data in the RAM 104 thereof (indicated by the arrow 50). In the process 40, the motor control functional block 121 of the microcomputer 103 of the throttle control ECU 12 outputs a control signal based on the data of the RAM 104 to the motor.

Further, in the process 42, the engine control functional block 143 of the microcomputer 103 of the engine control ECU 14 receives the data of the target amount of fuel to be injected from the injector and data of the ignition timing from the power train coordinator 141, and controls the injector and the plug according to the data.

In the vehicle control system for delivering a signal indicating a result of the separate process from a current process functional block to a succeeding process functional block, a check code (corresponding to order check information) indicated by a numeral is further added to the signal.

Figure 6:
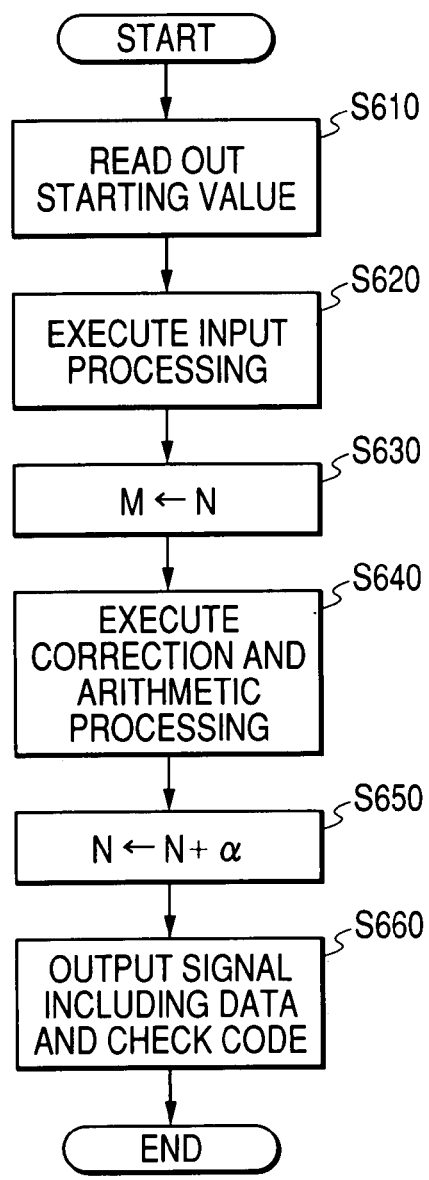
FIG. 6 is a flowchart showing the processing including the production of a check code executed in the series of processes in an accelerator output functional block of an engine control ECU according to the first and second embodiments of the present invention.
Figure 7:
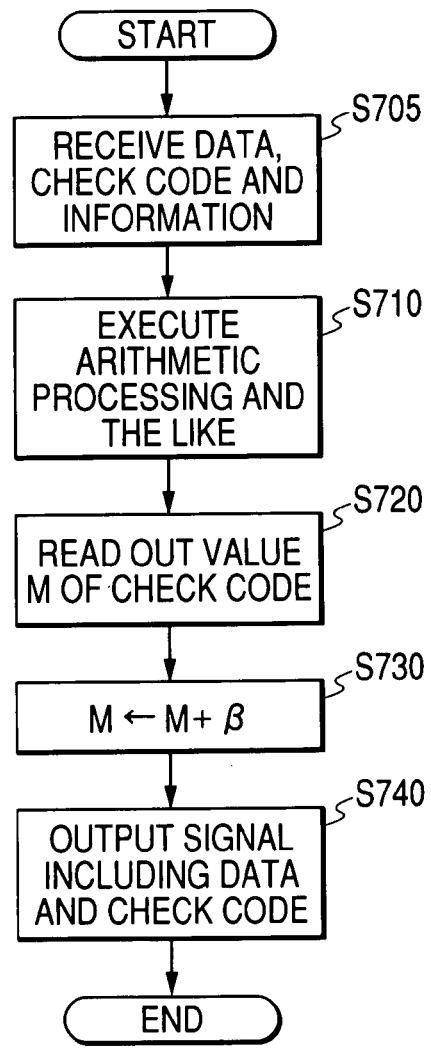
FIG. 7 is a flow chart showing the processing including the renewal of the check code executed in the series of processes in a vehicle stabilization control coordinator, a vehicle movement coordinator, a vehicle coordinator, a power train coordinator, a motor control functional block and an engine control functional block according to the first and second embodiments of the present invention.
Figure 8:
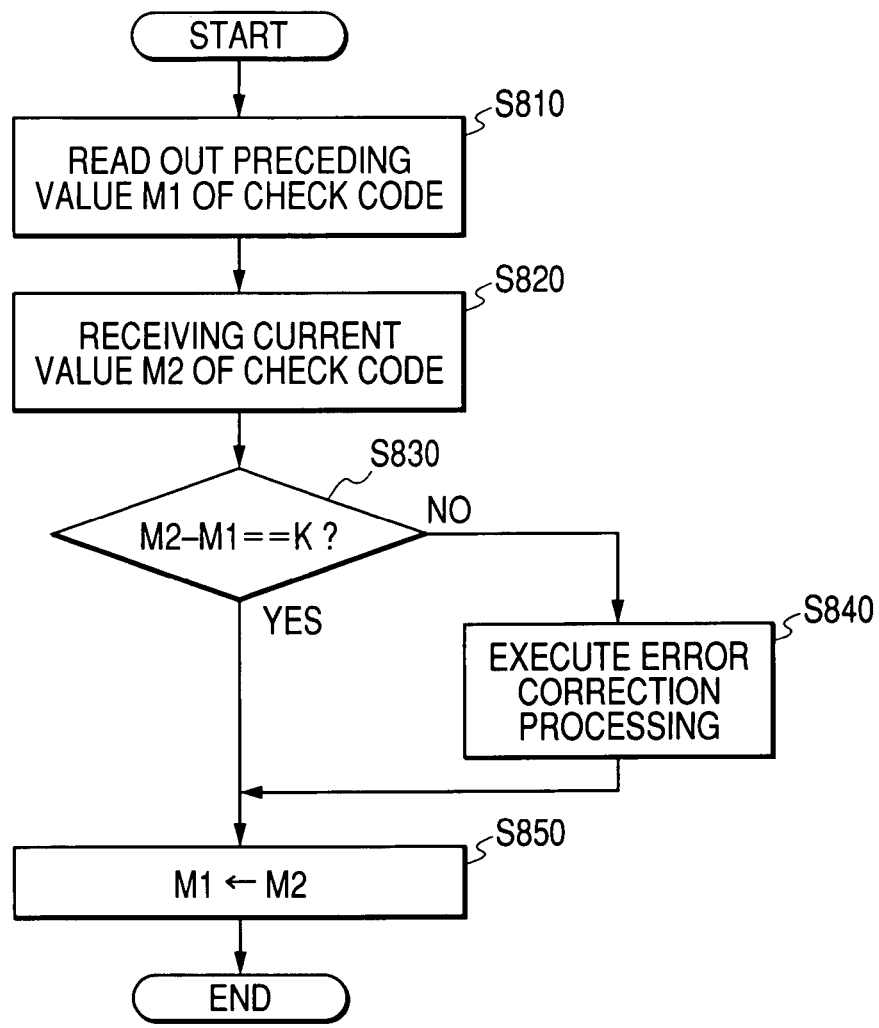
FIG. 8 is a flow chart showing the procedure of sequence check executed by a sequence check functional block 122 to judge whether or not a sequence error occurs in the process functional blocks according to the first embodiment of the present invention.

Flow charts of the processing of the addition of a check code to a signal of data indicating the result of the separate process in the data delivery between process functional blocks are shown in FIGS. 6, 7 and 8.

FIG. 6 is a flow chart showing the processing in the acceleration output functional block 142 of the engine control ECU 14 which is first operated as a first separate processing functional block in each series of processes shown in FIG. 5. When electric power is supplied to the vehicle control system, a program of the acceleration output function of the engine control ECU 14 is executed at a predetermined timing (for example, at a timing of the slot A every two cycle), and the operation of the acceleration output functional block 142 is started.

At step S610, a read-out part of the acceleration output functional block 142 reads out a starting value (corresponding to starting information) N of a check code from a predetermined area of the flash memory 107 of the microcomputer 103. Just after electric power is supplied to the vehicle control system, the starting value N is automatically set at an initial value, for example, of $N_0=5$.

At step S620, a separate process part of the acceleration output functional block 142 obtains a detection signal from the acceleration sensor and executes input processing for the detection signal.

At step S630, a setting part of the acceleration output functional block 142 sets a variable M stored in a predetermined area of the RAM 106 at the starting value N of the check code read out at step S610. The variable M denotes a value of the check code.

At step S640, the separate process part of the acceleration output functional block 142 executes correction and arithmetic processing for data of the detection signal processed at step S620, and data indicating a result of the separate process is obtained. For example, the data of the detection signal is rounded down in the correction and arithmetic processing.

At step S650, a storing part of the acceleration output functional block 142 works to renew the starting value N of the check code. More particularly, the storing part increments the starting value N of the check code by α (N←N+α) and stores the incremented starting value N in the predetermined area of the flash memory 107. α is, for example, equal to 10. In other words, a value of the predetermined area of the flash memory 107 is so rewritable as to be greater by α than a current value.

At step S660, the acceleration output functional block 142 adds the check code of the value M set at step S630 to a signal of the data obtained at step S640, and adds information specifying the vehicle stabilization control coordinator 152 of the ABS control ECU 15 to the signal to address the data to the vehicle stabilization control coordinator 152. Then, an output part of the acceleration output functional block 142 outputs the signal including the data and the check code of the value M to the protocol IC 102 of the engine control ECU 14 to output the signal to the serial communication line 10 at a timing of the slot B, and the processing at one slot A is completed in the acceleration output functional block 142.

This processing is, for example, executed every two cycles until electric power supplied to the vehicle control system is stopped. Therefore, the starting value N of the check code is incremented by α every two cycles, and the check code outputted from the acceleration output functional block 142 of the engine control ECU 14 is incremented by α every two cycles.

Figure 9:
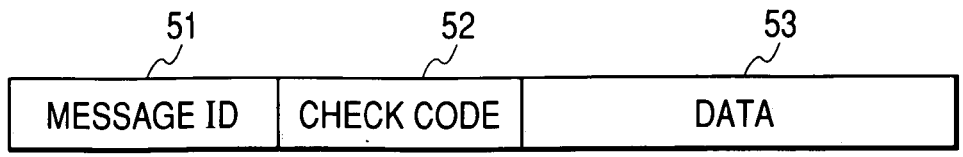
FIG. 9 is a data frame including information, check code and data outputted from each ECU.

A data frame (omitting a header) of the signal is shown in FIG. 9. The data frame is configured by an area of a message ID 51 (denoting the information added to the data) denoting an identifier of the transmission data, an area of the check code 52 subsequent to the message ID 51 and an area of the data 53 obtained at step S640. The message ID 51, the check code 52 and the data 53 of the data frame are transmitted as a group.

As described above, the acceleration output functional block 142, which denotes the process functional block first outputting a signal of a result of the separate process in the series of processes, outputs the signal including the check code. The value of the check code is increased by α each time the signal is outputted to the serial communication line 10.

FIG. 7 is a flow chart showing the processing executed in each of the process functional blocks other than the first process functional block, that is, the vehicle stabilization control coordinator 152, the vehicle movement coordinator 151, the vehicle coordinator 111, the power train coordinator 141, the motor control functional block 121 and the engine control functional block 143.

When a program of the processing is executed at a predetermined timing in each process functional block, the current process functional block receives a signal of a data frame including data, the check code and information outputted by a preceding process functional block (step S705). When the ECU of the preceding process functional block differs from that of the current process functional block, the current process functional block receives the signal including the data, the check code and the information from the protocol IC 102. When the ECU of the preceding process functional block is the same as that of the current process functional block, the current process functional block receives the signal including the data, the check code and the information from the flash memory or by the inter-process communication.

At step S710, the process functional block executes arithmetic processing or storage processing. For example, each of the vehicle stabilization control coordinator 152 and the vehicle movement coordinator 151 merely stores the received data in the RAM 106 to transfer the data. The vehicle coordinator 111 executes the processing for calculating a target torque according to the received data. The motor control functional block 121 of the throttle control ECU 12 stores data of a target amount of intake air, and calculates a motor control signal from the data of the target amount of intake air.

At step S720, the process functional block reads out the value M from the area of the check code 52 obtained at step S705.

At step S730, the process functional block renews the check code by incrementing the value M by a value of β (M←M+β). β is, for example, equal to 2.

At step S740, the process functional block adds the check code renewed at step S730 to data indicating a result of the processing executed at step S710, and an output part of the process functional block outputs a signal including the data and the check code so as to transmit the signal to a succeeding process functional block. That is, when the ECU of the succeeding process functional block differs from that of the current process functional block, the current process functional block adds information specifying the ECU of the succeeding process functional block to the signal, and the output part of the functional block outputs the signal including the data, the check code and the information to the protocol IC 102. When the ECU of the succeeding process functional block is the same as that of the current process functional block, the output part of the functional block delivers the signal including the data and the check code to the succeeding process functional block by using the flash memory or the inter-process communication. Then, the processing of the process functional block is completed.

Therefore, the check code received from the preceding process functional block is incremented by the value of β in the current process functional block, and the signal having the incremented check code is delivered to the succeeding process functional block.

Figure 10:
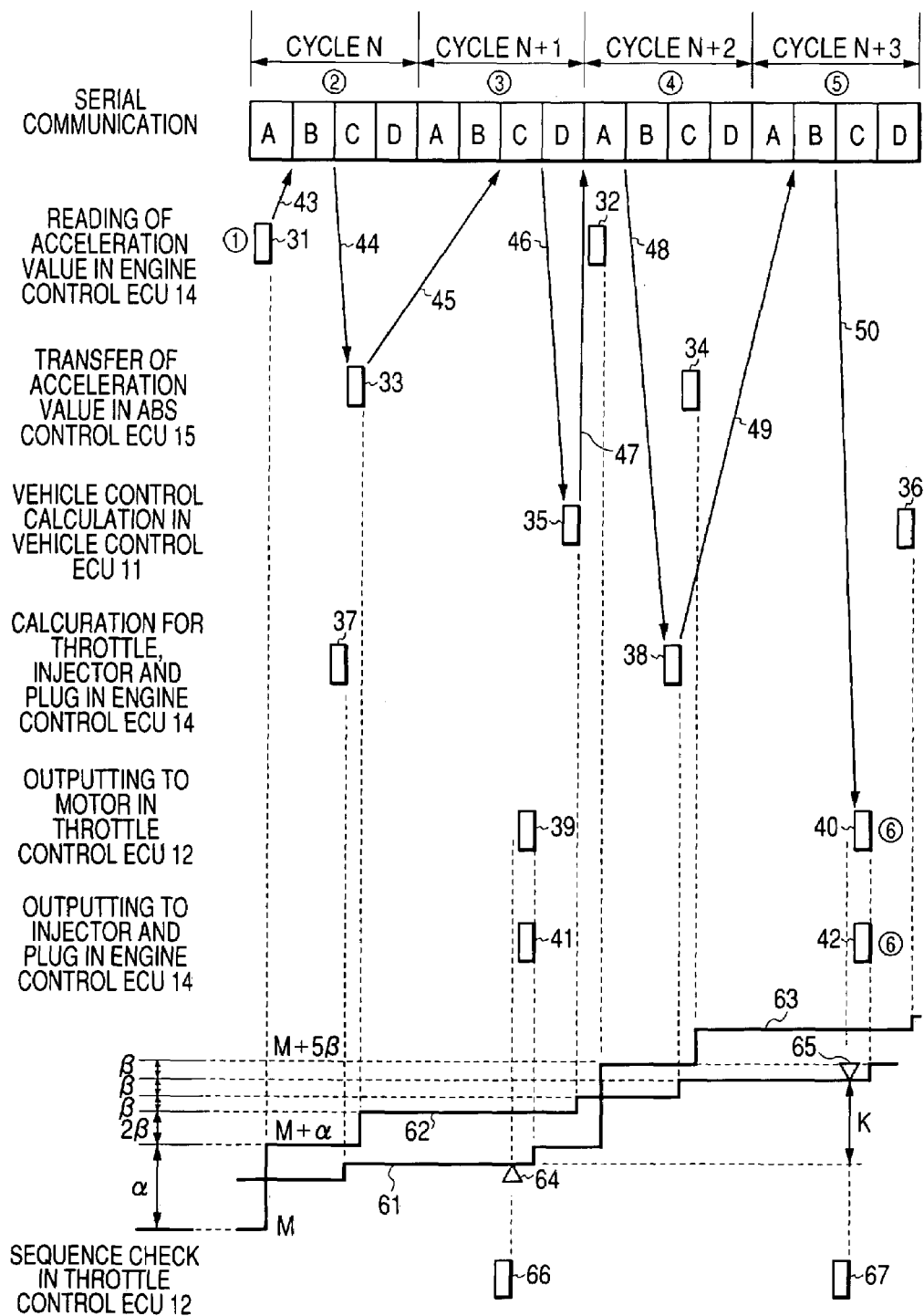
FIG. 10 is a view showing a time sequential change of the check code and a sequence check performed based on values of the check code in two series of processes according to the first embodiment of the present invention.

Accordingly, after the supply of the electric power to the vehicle control system, a j-th series of processes is currently executed by completing the execution of the series of processes j−1 times (j denotes a natural number) and the separate process is executed k times in the j-th series of processes (k denotes a natural number). In this case, the value M of the check code outputted with a result of the k-th separate process of the j-th series of processes is equal to $N_0+(j-1)\alpha+(k-1)\beta$. A time sequential change of the value M of the check code outputted from the current process functional block to the succeeding process functional block is shown in FIG. 10. A stepwise line 62 indicates a time sequential change of the value M of the check code included in the signal delivered in the current series of processes 31, 33, 35, 38, 40 and 42. A stepwise line 61 indicates a time sequential change of the value M of the check code included in the signal delivered in the processes 37, 39 and 41 of the preceding series. A stepwise line 63 indicates a time sequential change of the value M of the check code included in the signal delivered in the processes 32, 34 and 36 of the succeeding series. A rectangle 66 indicates a sequence check process for the preceding series corresponding to the stepwise line 61, and the sequence check process 66 is executed by the sequence check functional block 122 of the throttle control ECU 12 just before the process 39. A rectangle 67 indicates a sequence check process for the current series corresponding to the stepwise line 62, and the sequence check process 67 is executed by the sequence check functional block 122 just before the process 40. The execution timing of the process 67 is later than that of the process 66 by two cycles, and the sequence check functional block 122 executes the sequence check process every two cycles.

The preceding series of processes corresponding to the stepwise line 61 is executed just before the current series of processes corresponding to the stepwise line 62, and the succeeding series of processes corresponding to the stepwise line 63 is executed just after the current series of processes corresponding to the stepwise line 62.

Therefore, when the current series of processes corresponding to the stepwise line 62 is the j-th series executed after the electric power supply, the acceleration output functional block 142 of the engine control ECU 14 outputs the check code of the value $M=N_0+(j-1)\alpha$ set in the process 31. Thereafter, each of the vehicle stabilization control coordinator 152 and the vehicle movement coordinator 151 in the ABS control ECU 15 increments the check code by $\beta$. Therefore, the check code of the value $M=N_0+(j-1)\alpha+2\beta$ set in the process 33 is outputted from the ABS control ECU 15 to the vehicle coordinator 111. Thereafter, the vehicle coordinator 111 increments the check code by $\beta$ in the process 35 and outputs the check code of the value $M=N_0+(j-1)\alpha+3\beta$. Thereafter, the power train coordinator 141 increments the check code by $\beta$ in the process 38 and outputs the check code of the value $M=N_0+(j-1)\alpha+4\beta$.

Further, because the current series of processes is the j-th series, the preceding series of processes corresponding to the stepwise line 61 is the (j−1)-th series executed after the electric power supply. In this case, the power train coordinator 141 outputs the check code of the value of $M=N_0+(j-2)\alpha+4\beta$ set in the process 37.

Further, because the current series of processes is the j-th series, the succeeding series of processes corresponding to the stepwise line 63 is the (j+1)-th series executed after the electric power supply. In this case, each of the vehicle stabilization control coordinator 152 and the vehicle movement coordinator 151 in the ABS control ECU 15 increments the check code by $\beta$. Therefore, the check code of the value of $M=N_0+j\alpha+2\beta$ set in the process 34 is outputted from the ABS control ECU 15 to the vehicle coordinator 111. Thereafter, the vehicle coordinator 111 increments the check code by $\beta$ in the process 36 and outputs the check code of the value of $M=N_0+j\alpha+3\beta$.

As described above, one series of processes is allocated to the process functional blocks to execute each separate process of the series of processes in one corresponding process functional block, the series of processes is repeatedly executed to control the vehicle, and signals including results of the separate processes are designed to be delivered at predetermined timings (or under given conditions) among the process functional blocks in a predetermined order. Therefore, as shown in FIG. 10, when the deliveries of the signals including results of the separate processes are performed in the predetermined order, the value M of the check code changes with time at a predetermined increment.

However, an abnormality or a sequence error sometimes occurs in one process functional block. In this case, the deliveries of the signals including results of the separate processes among the process functional blocks are performed out of the predetermined order. As a result, a predetermined time sequential change of the value of the check code is not obtained. For example, the process 35 in the current series of processes corresponding to the stepwise line 62 is extremely loaded on the vehicle coordinator 111 for some reason, the outputting of a signal including a result of the process 35 is delayed, and a target value of the torque is not calculated before a timing of the slot A of the cycle N+2. In this case, the vehicle coordinator 111 cannot output a signal including data of the target value of the torque and a renewed check code to the serial communication line 10 at a predetermined timing. Therefore, because the check code stored in the RAM 104 of the protocol IC 102 of the power train coordinator 141 of the succeeding step is not replaced with a check code renewed in the vehicle coordinator 111 in the current series of processes, the value of the check code remains to that set in the preceding series of processes. As a result, a predetermined time sequential change of the value of the check code is not obtained.

FIG. 8 is a flow chart showing the procedure of sequence check performed by the sequence check functional block 122 to judge whether or not a sequence error occurs in the process functional blocks so as not to perform the deliveries of the signals among the process functional blocks in the predetermined order. In this embodiment, a program of this sequence check is executed by the sequence check functional block 122 of the CPU 105 of the microcomputer 103 of the throttle control ECU 12. In this case, because the throttle control ECU 12 has the motor control functional block 121 denoting the process functional block for finally controlling the actuator, there is a merit that the throttle control ECU 12 can immediately and directly stop the motor control function without outputting a stop instruction to the serial communication line 10.

The sequence check function of the sequence check functional block 122 is periodically executed just after the reception of the signal of the power train coordinator 141 of the engine control ECU 14 in the motor control functional block 121 of the throttle control ECU 12 and before the execution of the motor control functional block 121. That is, in FIG. 10, the sequence check functional block 122 is operated at a timing 64 of the sequence check process 66 just before the processes 39 and 41 of the last process functional blocks (in this embodiment, the motor control functional block 121 and the engine control functional block 143) for the preceding series of processes, and then the sequence check functional block 122 is operated at a timing 65 of the sequence check process 67 just before the processes 40 and 42 of the last process functional blocks for the current series of processes.

In FIG. 8, when the operation of the sequence check functional block 122 for the current series of processes is started at the timing 65 of the process 67, the sequence check functional block 122 reads out a preceding value M1 of the check code from a predetermined area of the RAM 106 of the microcomputer 103 of the corresponding ECU (that is, throttle control ECU 12) (step S810). The preceding value M1 of the check code has been stored in the RAM 106 at the timing 64 of the process 66 in the preceding series of processes.

At step S820, the sequence check functional block 122 receives, from the serial communication line 10, a current value M2 of the check code which is renewed in the process 38 by the power train coordinator 141 of the engine control ECU 14.

When the electric power supplied to the vehicle control system is not stopped during the two cycles between the processes 66 and 67, the value M of the check code is normally incremented in every series of processes by $\alpha$ according to the processing shown in FIG. 6. However, when a sequence error occurs in the process functional blocks, a difference between M2 and M1 differing from $\alpha$ is obtained.

Therefore, at step S830, the sequence check functional block 122 calculates a subtracted value by subtracting the preceding value M1 from the current value M2, and judges whether or not a sequence error occurs in the process functional blocks by comparing the subtracted value M2−M1 with a predetermined value K set at the value of α. When the subtracted value is equal to the predetermined value K(M2−M1=K), it is judged that no sequence error occurs in the process functional blocks of the ECUs during the current series of processes, followed by step S850. In this case, because no signal is delivered in the process 40 or 42 from the last process functional block (the engine control functional block 143 of the engine ECU 14 or the motor control functional block of the throttle control ECU 12) to another process functional block, no sequence error occurs caused by the process of the last process functional block.

On the other hand, when the subtracted value differs from (or is smaller than) the predetermined value K, it is judged that a sequence error occurs in any of the processes 31, 33, 35 and 38 of the process functional blocks, and the procedure proceeds to step S840.

At step S840, error correction processing for the sequence error is executed, followed by step S850.

More particularly, at step S710 of FIG. 7, the motor control functional block 121 of the throttle control ECU 12 stores a flag indicating no occurrence of a sequence error with data of a target amount of intake air in the RAM 106 (or the flash memory 107) for each series of processes. When no sequence error occurs in the process functional blocks, the motor control functional block 121 reads out the data of the target amount of intake air stored during the current series of processes from the RAM 106 according to the flag indicating no occurrence of a sequence error, and calculates a motor control signal from the read-out data.

Contrarily, when a sequence error occurs, the sequence check functional block 122 of the throttle control ECU 12 changes the flag of the RAM 106 of the same ECU to a flag (corresponding to a detection signal or a judgment result) indicating the occurrence of a sequence error before the motor control functional block 121 calculates a motor control signal in the current series of processes. In this case, at step S710 of FIG. 7, the motor control functional block 121 reads out the data of the target amount of intake air stored during the preceding series of processes from the RAM 106 according to the flag indicating the occurrence of a sequence error, and calculates a motor control signal from the read-out data of the preceding series.

The present invention should not be construed as limiting to the use of the data of the preceding series in case of the occurrence of a sequence error. For example, when a difference between the data of the current series and the data of the preceding series is small, the motor control functional block 121 may use the data of the current series even in case of the occurrence of a sequence error. Further, in case of the occurrence of a sequence error, the motor control functional block 121 may use a predetermined value as the data of the current series.

At step S850, the preceding value M1 of the check code stored in the predetermined area of the RAM 106 is replaced with the current value M2 of the check code to use the current value M2 as a preceding value M1 in the succeeding series of processes, thereby completing of the operation of the sequence check functional block 122 in the process 67.

Thus, the sequence check functional block 122 can detect the occurrence of a sequence error by checking the difference between the value of the check code output from the power train coordinator 141 of the engine control ECU 14 in the current series and the value of the check code output from the power train coordinator 141 of the engine control ECU 14 in the preceding series.

In this sequence error check, when the errror correction processing at step S840 is repeatedly executed for a predetermined number of series of processes (for example, ten successive series of processes), it is preferred that all ECUs or a part of ECUs corresponding to the series of processes are reset.

Further, when the sequence error occurring in a plurality of process functional blocks of one ECU is detected, it is preferred that the sequence check functional block 122 judge the ECU as not being correctly operated.

As is described above, in the operation of the vehicle control system, when no sequence error occurs, each current process functional block receives a signal including a check code and a result of the separate process from a preceding process functional block, increments the value of the check code by a predetermined value, and delivers a signal including the check code of the incremented value and a result of the separate process of the current process functional block to a succeeding process functional block. Therefore, in case of no occurrence of a sequence error, the process functional blocks can deliver the signals in a predetermined order while incrementing the value of the check code in each process functional block. On the other hand, when a sequence error occurs in the process functional blocks in a series of processes, the series of processes is not completed under the give conditions, and the check code is not correctly incremented in this series. Thus, the sequence check functional block 122 can detect the occurrence of the sequence error according to the check code.

Therefore, in a vehicle control system, signals including results of separate processes of process functional blocks for a series of processes repeatedly executed to control a vehicle are designed to be delivered in a predetermined order among the process functional blocks, and the signal of the separate process result of each current process functional block is produced according to the signal of the separate process result of the preceding process functional block and is delivered to the succeeding process functional block. When the series of processes is not correctly completed under given conditions due to an abnormality or a sequence error, the sequence check functional block 122 detects that the deliveries of the signals are performed out of the predetermined order among the process functional blocks. Accordingly, the sequence check functional block 122 can detect the abnormality or the sequence error.

Further, the process functional blocks are classified into a plurality of groups of process functional block(s), and the incremented value of the check code in each of the process functional blocks of each group differs from those in the other groups. For example, the acceleration output functional block 142 of one group increments the check code by α, and each of the other process functional blocks of another group increments the check code by β. Therefore, the sequence check functional block 122 can specify the group in which the sequence error occurs.

Further, in the acceleration output functional block 142, the steps S610, S630 and S650 of FIG. 6 for incrementing the check code are not successively performed, and the steps S620 and S640 for performing the separate process are separately performed during the increment of the check code. Because the steps for the check code are dispersed into the separate process of the acceleration output functional block 142, the possibility of detecting an error locally occurring in the separate process can be heightened.

In this embodiment, the sequence check functional block 122 is arranged in the throttle control ECU 12 having one last process functional block finally operated in the series of processes. However, the present invention should not be construed as limiting to the throttle control ECU 12. For example, the sequence check functional block 122 may be arranged in the engine control ECU 14 having another last process functional block finally operated in the series of processes. In this case, there is a merit that a cover ratio of sequence error detection, that is, a ratio of the number of sequence error detectable process functional blocks to the number of all process functional blocks can be heightened. Further, each of the throttle control ECU 12 and the engine control ECU 14 may have the sequence check functional block 122 together. In this case, both merits can be obtained. Moreover, the sequence check functional blocks 122 may be placed only in one process functional block or a plurality of process functional blocks. In this case, even though one sequence check functional block 122 becomes inoperable for some reason, the other sequence check functional block(s) 122 are operated. Therefore, the sequence check can be reliably executed in the vehicle control system.

Further, the sequence check is executed according to the value of the check code outputted from the second last process functional block (that is, the power train coordinator 141). However, the present invention should not be construed as limiting to the second last process functional block, and the sequence check functional block 122 may detect that a part of the signals outputted from the process functional blocks for one series of processes are delivered out of a predetermined order. For example, the sequence check may be executed according to the value of the check code outputted from the first, second or third process functional block (that is, the acceleration output functional block 142, the vehicle movement control coordinator or the vehicle coordinator 111) firstly, secondly or thirdly operated in the series of processes.

Moreover, in this embodiment, the sequence check functional block 122 is arranged in the vehicle control system to check whether or not the deliveries of the signals of the process functional blocks are performed in the predetermined order, and it is judged that the series of processes is not correctly completed when the deliveries of the signals are performed out of predetermined order. However, the present invention should not be construed as limiting to the checking of the deliveries of the signals designed to be performed in the predetermined order. For example, in place of the sequence check functional block 122, a sequence check functional block arranged in one ECU may monitor a signal outputted from each of the process functional blocks of the ECUs and check whether or not each process functional block outputs the signal at a predetermined timing (or a given condition). When at least one process functional block outputs a signal at a time later than the predetermined timing, the sequence check functional block judges that the delivery of the signal of the process functional block to the succeeding process functional block is not correctly performed, and thus, the series of processes is not completed under the give condition.

Furthermore, in this embodiment, the sequence check functional block 122 checks whether or not the deliveries of the signals of the process functional blocks of the ECUs are performed in the predetermined order. However, the present invention should not be construed as limiting to the deliveries of the signals among the process functional blocks. For example, the sequence check functional block 122 may check whether or not the deliveries of the signals outputted from the ECUs are performed in the predetermined order.

Furthermore, in this embodiment, the sequence check functional block 122 checks whether or not the deliveries of the signals of the process functional blocks of the ECUs are performed in the predetermined order. However, the present invention should not be construed as limiting to the deliveries of the signals among the ECUs. For example, the sequence check functional block 122 may check whether or not the deliveries of the signals outputted from the process functional blocks of one ECU are performed in the predetermined order.

Second Embodiment

In the first embodiment, when the difference between the value of the check code outputted from the power train coordinator 141 of the engine control ECU 14 in the current series and the value of the check code outputted from the power train coordinator 141 of the engine control ECU 14 in the preceding series is not equal to the predetermined value of α, the sequence check functional block 122 detects the occurrence of a sequence error. However, the present invention should not be construed as limiting to the detection of the occurrence of a sequence error based on values of the check code in two different series of processes. That is, the occurrence of a sequence error may be detected according to values of the check code in one series of processes.

For example, the check code of the signal outputted from the first process functional block (in this embodiment, the acceleration output functional block 142) for a j-th series of processes is equal to a first value of $N_0+(j-1)\alpha$, and the check code of the signal outputted from the second last process functional block (in this embodiment, the power train coordinator 141) for the same j-th series of processes is equal to a second value of $N_0+(j-1)\alpha+k\beta$ (in this embodiment, k=4). Therefore, when a difference between the first and second values of the check code differs from a predetermined value of $k\beta$, the sequence check functional block 122 may judge that a sequence error occurs in this series of processes.

Figure 11:
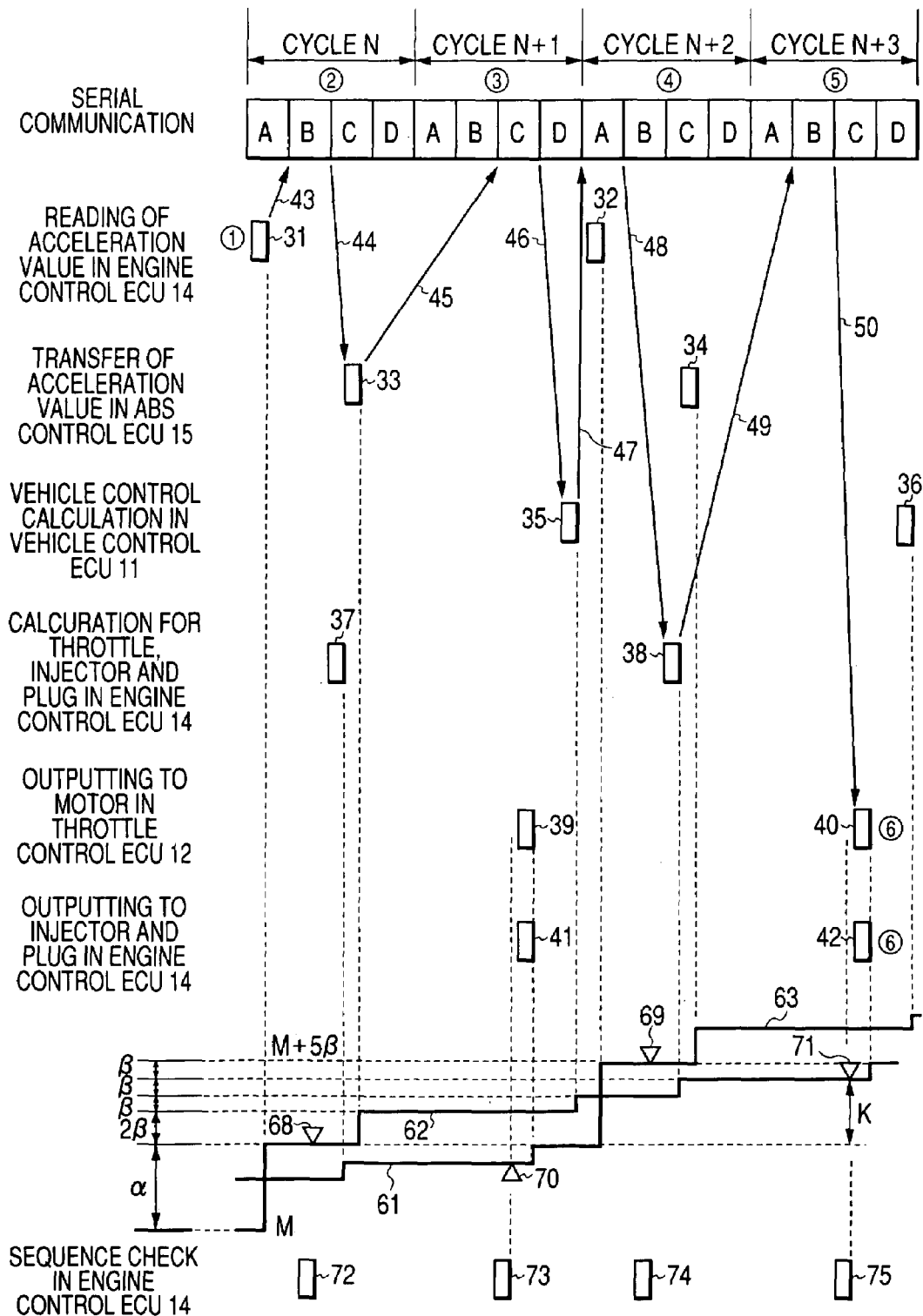
FIG. 11 is a view showing the time sequential change of the check code and a sequence check performed based on values of the check code in one series of processes according to the second embodiment of the present invention.

FIG. 11 is a view showing the time sequential change of the check code and a sequence check performed based on values of the check code in one series of processes according to the second embodiment of the present invention.

In this embodiment, the sequence check functional block 122 is arranged in the engine control ECU 14, and the sequence check function is executed by the sequence check functional block 122 of the CPU 105 of the microcomputer 103 of the engine control ECU 14. Rectangle 72 and 75 indicate sequence check processes for the current series corresponding to the stepwise line 62, the process 72 is executed at a timing 68 just after the process 31 of the acceleration output functional block 142, and the process 75 is executed at a timing 71 just after the engine control ECU 14 receives the data from the power train coordinator 141 in the current series. A rectangle 73 indicates a sequence check process for the preceding series corresponding to the stepwise line 61, and the process 73 is executed at a timing 70 just after the engine control ECU 14 receives the data from the power train coordinator 141 in the preceding series. A rectangle 74 indicates a sequence check process for the succeeding series corresponding to the stepwise line 63, and the process 74 is executed at a timing 69 just after the process 32 of the acceleration output functional block 142.

The sequence check process is executed twice for each series of processes and is executed for each cycle. The sequence check function of the sequence check functional block 122 is periodically executed after the delivery of the signal of the acceleration output functional block 142 of the engine control ECU 14 to the vehicle stabilization control coordinator 152. Further, the sequence check function is periodically executed after the delivery of the signal of the power train coordinator 141 of the engine control ECU 14 to the motor control functional block 121 of the throttle control ECU 12 and just before the execution of the engine control functional block 143 of the engine control ECU 14.

Figure 12:
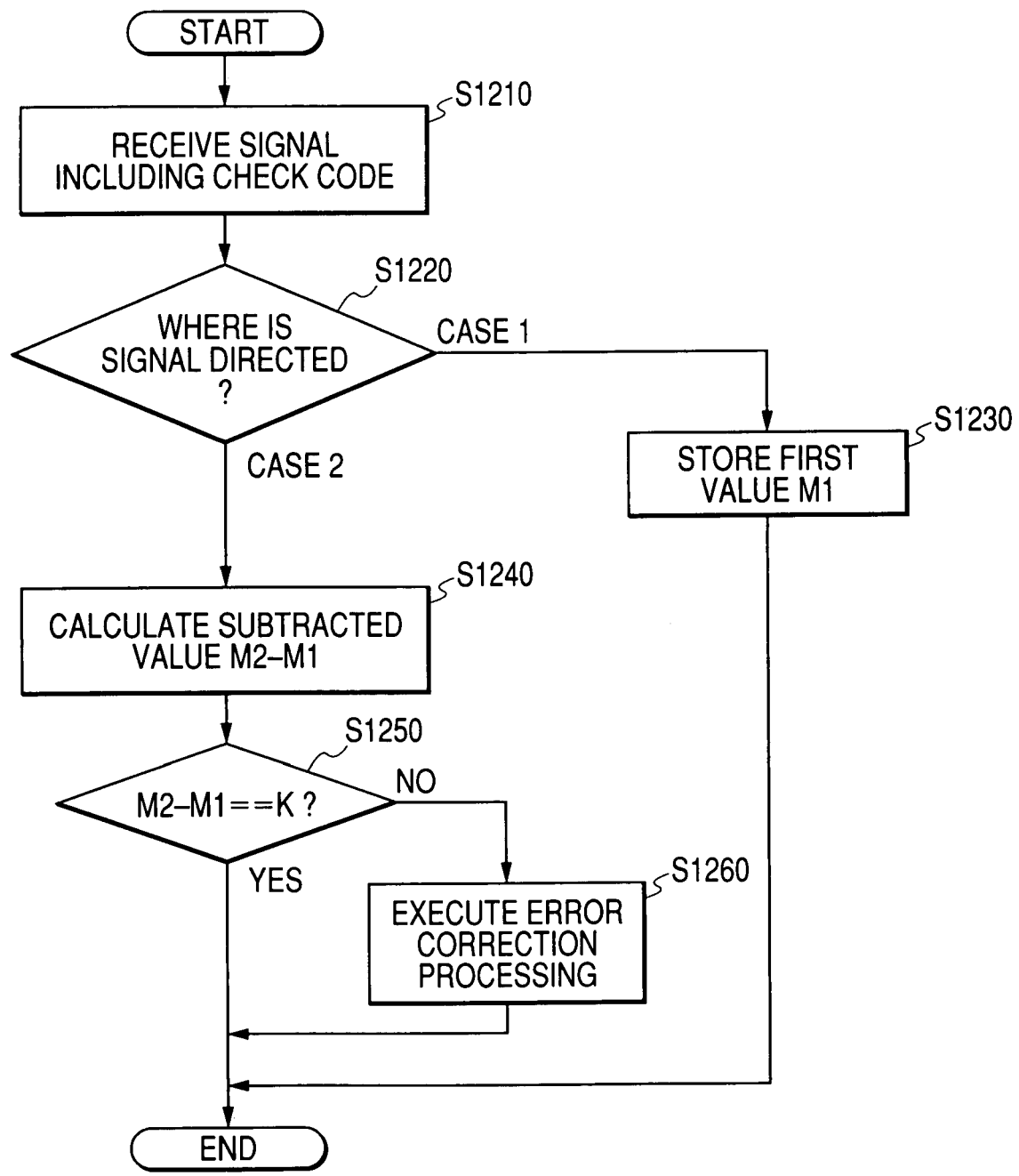
FIG. 12 is a flow chart showing the procedure of sequence check executed by a sequence check functional block according to the second embodiment of the present invention.

FIG. 12 is a flow chart showing the procedure of a sequence check executed by the sequence check functional block 122 according to the second embodiment of the present invention. In this embodiment, a program of this sequence check is, for example, executed by the sequence check functional block 122.

The sequence check functional block 122 is operated at the timings 68, 70, 69 and 71 during the cycles N to N+3. The procedure of the sequence check only for the current series of processes is described with reference to FIG. 12. The sequence check functional block 122 is operated at the timings 68 and 71 for the current series of processes.

At step S1210, the sequence check functional block 122 receives the signal including a check code, information and data from the serial communication line 10 or due to the inter-process communication.

At step S1220, the sequence check functional block 122 judges, according to the information, whether the signal received at step S1210 is addressed to the second process functional block or the last process functional block. When the signal is addressed to the second process functional block (case 1), the procedure proceeds to step S1230. When the signal is addressed to the last process functional block (case 2), the procedure proceeds to step S1240. In this embodiment, because the sequence check functional block 122 and the first process functional block (that is, acceleration output functional block 142) are arranged in the engine control ECU 14 together, the sequence check functional block 122 receives the signal addressed to the second process functional block due to the inter-process communication. Further, because the sequence check functional block 122 and the second last process functional block (that is, power train coordinator 141) are arranged in the engine control ECU 14 together, the sequence check functional block 122 receives the signal addressed to the last process functional block due to the inter-process communication.

At step S1230, the value M of the check code received at step S1210 is stored in a predetermined area of the RAM 106 as a first value M1, and the procedure is ended.

At step S1240, the sequence check functional block 122 calculates a subtracted value by subtracting the first value M1 stored in the RAM 106 at step S1230 from the value M2 of the check code currently received at step S1210.

At step S1250, the sequence check functional block 122 judges whether or not sequence error occurs in the process functional blocks by comparing the subtracted value M2−M1 with a predetermined value K set at the value of 4β. When the subtracted value is equal to the predetermined value K(M2−M1=K), the sequence check functional block 122 judges that no sequence error occurs in the process functional blocks of the ECUs in the current series of processes, and the procedure is completed. On the other hand, when the subtracted value differs from (or is smaller than) the predetermined value K, the sequence check functional block 122 judges that a sequence error occurs in the processes 31, 33, 35 and 38 of the process functional blocks, and the procedure proceeds to step S1260.

At step S1260, the error correction processing is executed in the same manner as that at step S840 of FIG. 8 in the first embodiment, and the procedure is completed.

Accordingly, the occurrence of sequence error in one series of processes can be detected according to values of the check code in one series of processes.

In the second embodiment, the engine control ECU 14 has the sequence check functional block 122. However, the throttle control ECU 12 may have the sequence check functional block 122, or the throttle control ECU 12 and the engine control ECU 14 may have the sequence check functional block 122 together.

Further, in the first and second embodiments, one type series of processes is allocated to a fixed group of process functional blocks and is repeatedly executed by the process functional blocks. However, a plurality of types of series of processes, which requires different groups of process functional blocks, may be executed in the vehicle control system.

In this case, when a first process functional block receiving a detection value from a sensor is required to execute each of the types of series of processes, the incremented value α of the check code set in the first process functional block for each type of series of processes may differ from those set in the first process functional block for the other types of series of processes. In addition, the fixed value of $N_0$ in the starting value N set in the first process functional block f or each type of series of processes may differ from those set in the first process functional block for the other types of series of processes.

Further, in the first and second embodiments, all process functional blocks operated in one series of processes are not required to increase the value of the check code, and only a group of specific process functional blocks denoting all or a part of the process functional blocks may increase the value of the check code. In the first and second embodiments, all process functional blocks are operated for the series of processes as the specific process functional blocks.

Third Embodiment

In the first and second embodiments, the check code is incremented by α or β in each of the process functional blocks. However, in the third embodiment, the check code does not have a changeable value, but has a plurality of check flags corresponding to the process functional blocks, respectively. When each process functional block outputs a signal, the process functional block changes a corresponding check flag indicating a non-delivery state to a flag indicating a delivery state.

Figure 13:
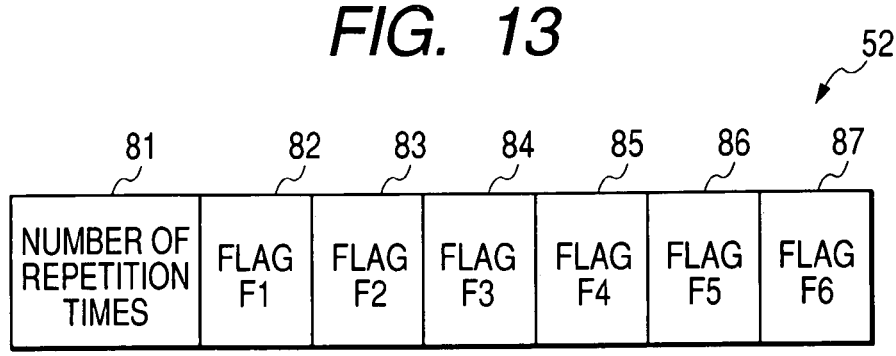
FIG. 13 is a view showing the configuration of a check code having a plurality of flags according to the third embodiment.

FIG. 13 is a view showing the configuration of a check code 52 having a plurality of flags according to the third embodiment.

In FIG. 13, the check code 52 has a top area 81 of a plurality of bits and six flag areas 82 to 87 subsequent to the top area 81. Each flag area is composed of one bit to hold a flag set at "0" or "1". The flag F1 of the flag area 82 is allocated to the acceleration output functional block 142. The flag F2 of the flag area 83 is allocated to the vehicle stabilization control coordinator 152. The flag F3 of the flag area 84 is allocated to the vehicle movement coordinator 151. The flag F4 of the flag area 85 is allocated to the vehicle coordinator 111. The flag F5 of the flag area 86 is allocated to the power train coordinator 141. The flag F6 of the flag area 87 is allocated to the motor control functional block 121 or the engine control functional block 143. As shown in FIG. 9, the check code 52 processed in each current process functional block is delivered with data to a succeeding process functional block.

Therefore, one flag is allocated to each of the process functional blocks corresponding to the series of processes shown in FIG. 4.

Figure 14:
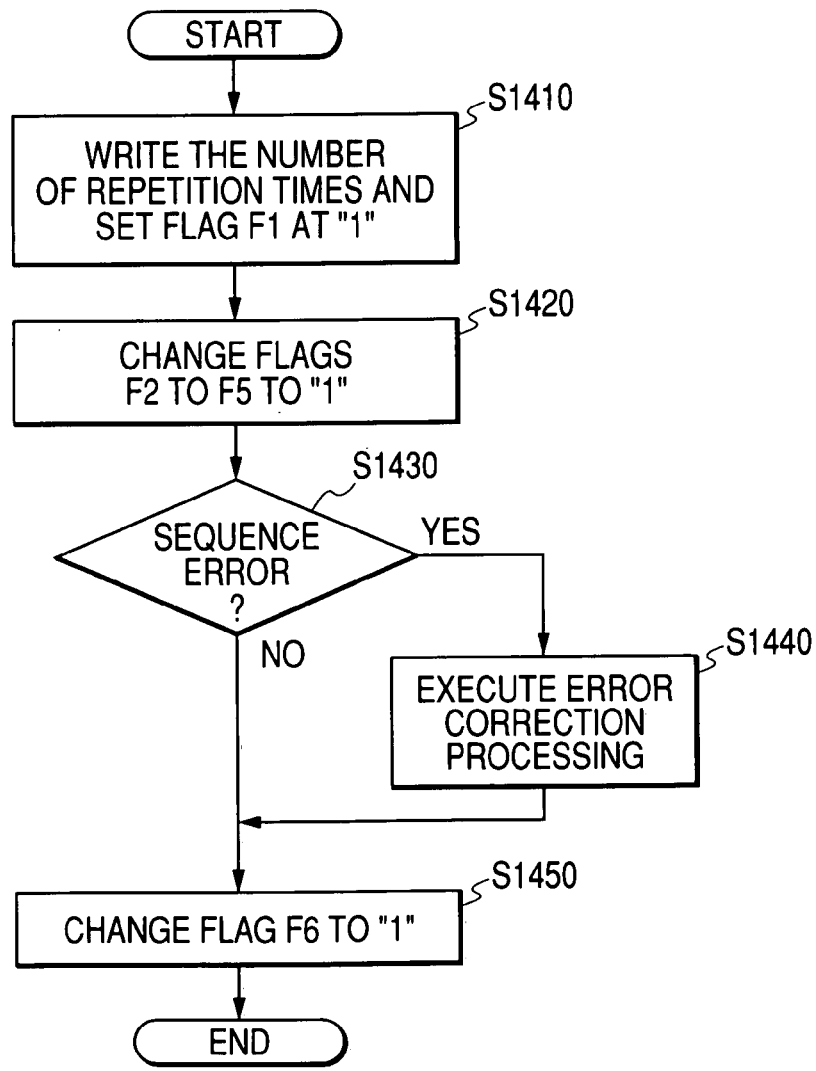
FIG. 14 is a flow chart showing the processing for changing the check code of FIG. 13 according to the third embodiment.

FIG. 14 is a flow chart showing the processing for changing the check code 52 in the process functional blocks for a series of processes according to the third embodiment.

At step S1410, when the operation of the acceleration output functional block 142 denoting the first process functional block is started, the acceleration output functional block 142 sets the flags of the flag areas 83 to 87 at the value "0" indicating a non-delivery state. Then, the acceleration output functional block 142 writes the number of reputation times of the series of processes in the top area 81, and sets the flag F1 of the flag area 82 at the value "1" indicating a delivery state. Thereafter, the acceleration output functional block 142 outputs the check code 52 and data 53 to the serial communication line 10.

At step S1420, each of the process functional blocks subsequent to the acceleration output functional block 142 receives the check code 52 outputted to the serial communication line 10 or due to the inter-process communication, and changes the flag of the corresponding flag area to the value "1". Thereafter, the process functional block outputs the check code 52 and data 53 to the serial communication line 10.

Therefore, when no sequence error occurs in the process functional blocks, the flags of the flag areas 82 to 86 are set at the value "1" together. On the other hand, when a sequence error occurs in the process functional blocks, the flag of the flag area allocated to at least one process functional block remains the value "0".

At step S1430, the sequence check functional block 122 receives the check code 52 outputted to the serial communication line 10 or receives the check code 52 due to the inter-process communication, and judges whether or not a sequence error occurs in at least one of the process functional blocks. In detail, the sequence check functional block 122 examines the flags F1 to F5 of the flag areas 82 to 86. When the flags are set at the value "1" together, the sequence check functional block 122 judges that no sequence error occurs, and the procedure proceeds to step S1450. On the other hand, when at least one of the flags are set at the value "0", the sequence check functional block 122 judges that a sequence error occurs in the process functional block corresponding to the flag set at the value "0", and the procedure proceeds to step S1440.

At step S1440, the error correction processing is executed in the same manner as that at step S840 of FIG. 8.

At step S1450, the motor control functional block 121 or the engine control functional block 143 denoting the last process functional block receives the check code 52 outputted to the serial communication line 10, and changes the flag F6 of the corresponding flag area 87 to the value "1".

Accordingly, the sequence error can be detected in the same manner as in the first and second embodiments.

Further, the sequence check functional block 122 can specify the process functional block from which data 53 is not outputted at a predetermined timing.

Fourth Embodiment

Figure 15:
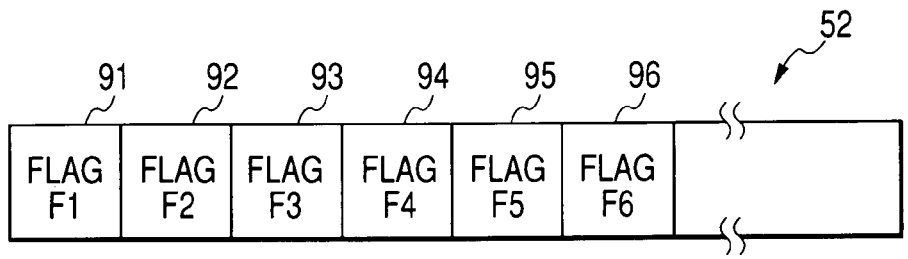
FIG. 15 is a view showing the configuration of a check code having a plurality of flags according to the fourth embodiment.

FIG. 15 is a view showing the configuration of a check code 52 having a plurality of flags according to the fourth embodiment. In the fourth embodiment, a plurality of flags of the check code 52 are allocated to all the process functional blocks of the vehicle control system, respectively.

In FIG. 15, the check code 52 has a flag area 91 of a flag F1 allocated to the power train coordinator 141, a flag area 92 of a flag F2 allocated to the vehicle movement coordinator 151, a flag area 93 of a flag F3 allocated to the vehicle coordinator 111, a flag area 94 of a flag F4 allocated to a throttle control functional block of the throttle control ECU 12, a flag area 95 of a flag F5 allocated to an ABS control functional block of the ABS control ECU 15, a flag area 96 of a flag F5 allocated to the vehicle stabilization control coordinator 152, and flag areas (not shown) of flags allocated to the other process functional blocks of the vehicle control system. Each flag area has one bit.

Figure 16:
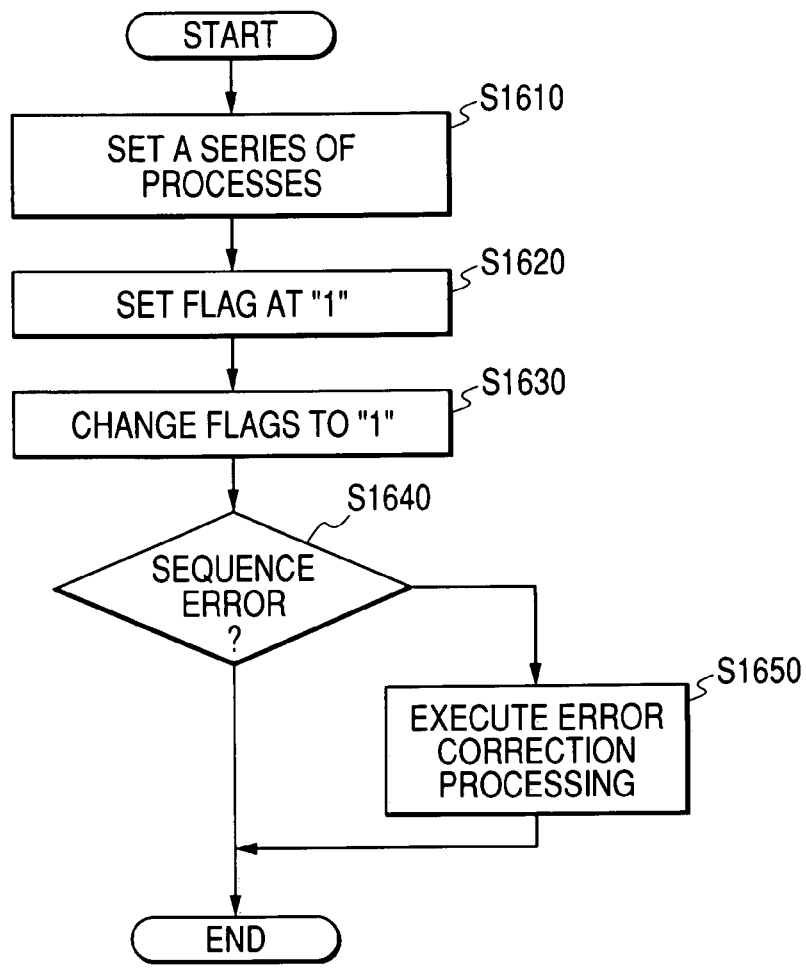
FIG. 16 is a flow chart showing the processing for the check code of FIG. 15 according to the fourth embodiment.

FIG. 16 is a flow chart showing the processing for the check code 52 according to the fourth embodiment.

At step S1610, a series of processes requiring a part of the process functional blocks of the vehicle control system or corresponding to all the process functional blocks of the vehicle control system is set.

At step S1620, when the operation of the first process functional block in the series of processes is started, the first process functional block sets the flags of all the flag areas at the value "0" indicating a non-delivery state. Then, the first process functional block sets the flag of the corresponding flag area at the value "1" indicating a delivery state. Thereafter, the first process functional block outputs the check code 52 and data 53 to the serial communication line 10.

At step S1630, each of the process functional blocks subsequent to the first process functional block in the series of processes receives the check code 52 outputted to the serial communication line 10 or due to the inter-process communication, and changes the flag of the corresponding flag area to the value "1". Thereafter, the process functional block outputs the check code 52 and data 53 to the serial communication line 10.

Therefore, when no sequence error occurs in the process functional blocks corresponding to the series of processes, the flags of the corresponding flag areas are set at the value "1" together. On the other hand, when a sequence error occurs in one process functional block, the flag of the flag area allocated to the process functional block remains the value "0".

At step S1640, the sequence check functional block 122 receives the check code 52 outputted to the serial communication line 10 or due to the inter-process communication, and examines the flags of the corresponding flag areas to judge whether or not a sequence error occurs in at least one of the process functional blocks. When the flags are set at the value "1" together, the sequence check functional block 122 judges that no sequence error occurs, and the procedure proceeds to step S1660. On the other hand, when at least one of the flags are set at the value "0", the sequence check functional block 122 judges that sequence error occurs in the process functional block corresponding to the flag set at the value "0", and the procedure proceeds to step S1650.

At step S1650, the error correction processing is executed in the same manner as at step S840 of FIG. 8.

Accordingly, the sequence error can be detected in the same manner as in the first and second embodiments.

Further, when a first series of processes requiring a first group of process functional blocks and a second series of processes requiring a second group of process functional blocks are executed, the sequence check for the first series of processes and the sequence check for the second series of processes can be executed by using the same check code 52. Accordingly, the sequence check can be simplified.

In the fourth embodiment, the flags of the check code 52 are allocated to all the process functional blocks of the vehicle control system, respectively. However, flags of the check code 52 may be allocated to a part of the process functional blocks of the vehicle control system, respectively.

Fifth Embodiment

In the first to fourth embodiments, only one first process functional block receives a value detected by one sensor. However, a plurality of first process functional blocks may receive values detected by a plurality of sensors, respectively. In this case, a process functional block of the upper layer such as the vehicle coordinator 111 synthetically process pieces of data outputted by the first process functional blocks. For example, data of a steering output functional block of the steering control ECU 16 receiving a detection value of a steering sensor and data of the acceleration output functional block 142 receiving a detection value of the acceleration sensor may be delivered to the vehicle coordinator 111 to determine a target value of the torque in the vehicle coordinator 111 according to the detection values.

When pieces of data based on detected values are delivered to the process functional block of the upper layer, each of the first process functional blocks receiving detected values from sensors produces a check code, and the check codes are included in a data frame with the pieces of data in the process functional block of the upper layer.

Figure 17:
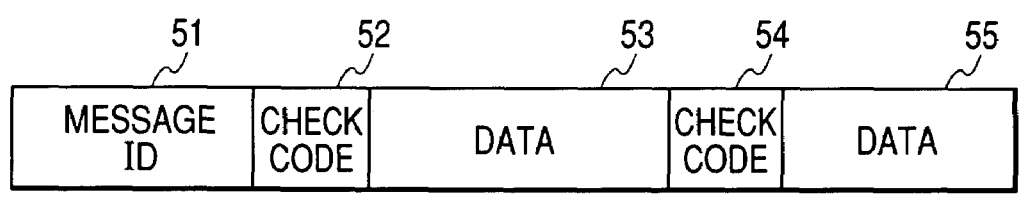
FIG. 17 is a view showing a data frame including two check codes and two pieces of data according to the fifth embodiment.

FIG. 17 is a view showing a data frame including two check codes and two pieces of data according to the fifth embodiment.

In FIG. 17, the data frame is composed of the message ID 51, a first check code 52 produced by the acceleration output functional block 142, first data 53 based on data outputted by the acceleration output functional block 142, a second check code 54 produced by the steering output functional block, and second data 55 based on data outputted by the steering output functional block.

The sequence check functional block 122 checks the value or flags of the first check code 52 and the value or flags of the second check code 54 in the same manner as in one of the first to fourth embodiments.

Accordingly, even though pieces of data based on detected values of sensors are delivered to the process functional block of the upper layer, the sequence check can be executed.

In the fifth embodiment, only one sequence check functional block 122 is used. However, a plurality of sequence check functional blocks 122 may be used to check a plurality of check codes of the data frame, respectively.

Sixth Embodiment

In the fifth embodiment, when pieces of data based on detected values of sensors are delivered to the process functional block of the upper layer, a plurality of check codes are arranged in the data frame. However, when degrees of reliability required of pieces of data delivered to the process functional block of the upper layer differ from each other, only one check code corresponding to the data required to have the highest degree of reliability may be arranged in the data frame.

Figure 18:
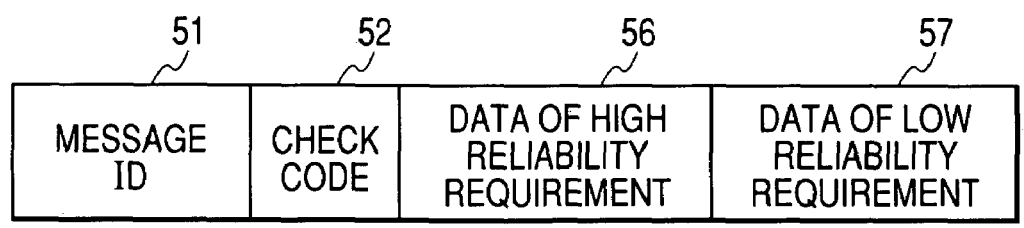
FIG. 18 is a view showing a data frame including only one check code and pieces of data according to the sixth embodiment.
Figure 19:
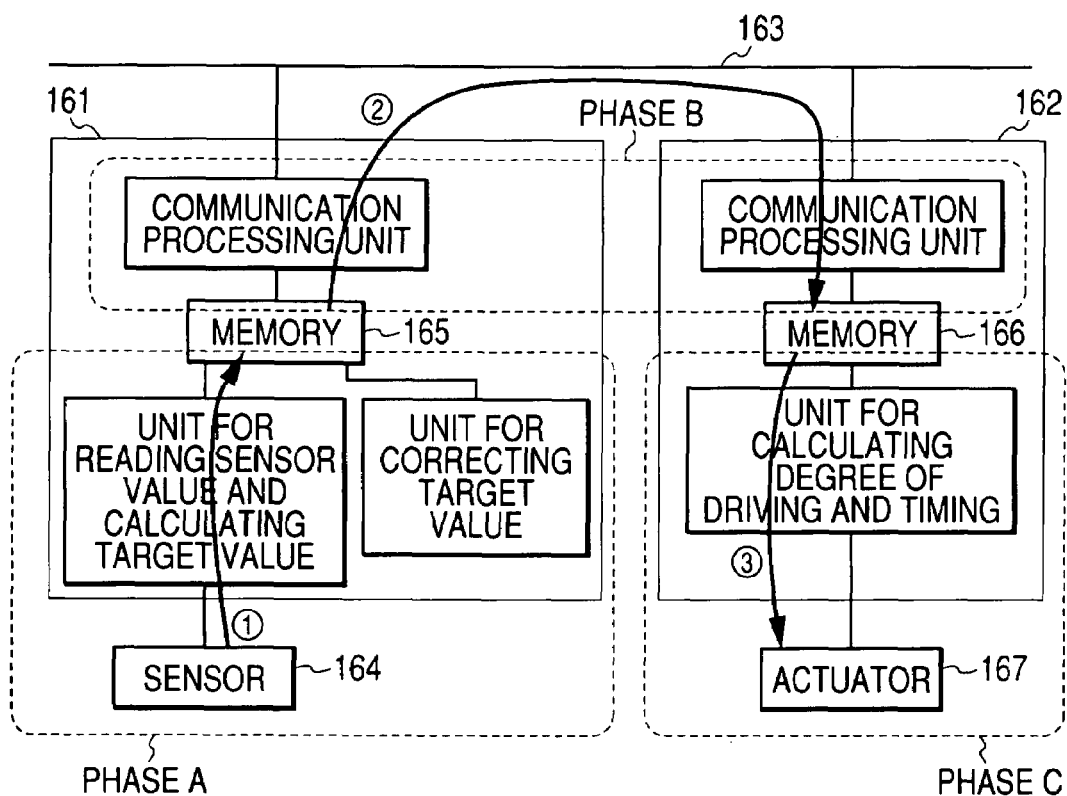
FIG. 19 is an explanatory view showing separate processes executed in the vehicle control system for controlling an actuator according to a value detected in a sensor.
Figure 20:
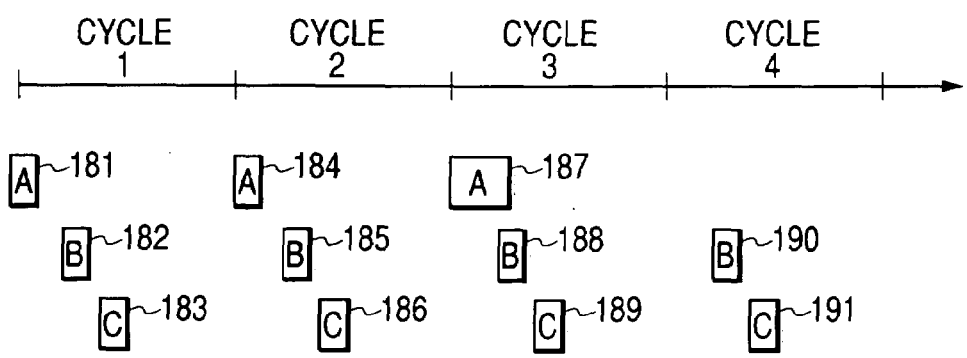
FIG. 20 is a timing chart showing timings at which a series of phases for a series of processes are repeatedly performed.

FIG. 18 is a view showing a data frame including only one check code and pieces of data according to the sixth embodiment.

In FIG. 18, the data frame is composed of the message ID 51, a check code 52 corresponding to data 56, the data 56 required to have a highest degree of reliability, and data 57 required to have a lowest degree of reliability.

The sequence check functional block 122 checks the value or flags of the check code 52 in the same manner as in one of the first to fourth embodiments to heighten the reliability of the data 56.

Accordingly, as compared with in the fifth embodiment, an amount of check code included in the data frame can be reduced, and the sequence check can be simplified.

In this embodiment, only one check code corresponding to data required to have the highest degree of reliability is arranged in the data frame. However, the present invention should not be construed as limiting only to one check code corresponding to the highest degree of reliability. For example, when pieces of data based on detected values of three sensors or more are delivered to the process functional block of the upper layer, a plurality of check codes corresponding to data required to have the higher degree of reliability may be arranged in the data frame.

The entire disclosure of Japanese Patent Application No. 2003-304459 filed on Aug. 28, 2003 including specification, claims and drawings are incorporated herein by reference in its entirety.

What is claimed is:

1. A vehicle control system, comprising:
a plurality of electronic control units which executes a series of processes under a given condition, each of the electronic control units having at least one functional block, each of the functional blocks executing one of the processes and outputting a signal including a result of the process, a first one of the functional blocks in execution of the series of processes receiving an input and executing the process using the input, each of the functional blocks subsequent to the first one executing the process using the signal delivered by a preceding one of the functional blocks, and a last one of the functional blocks in the execution of the series of processes outputting the signal for use in vehicle control; and
a detector which detects whether or not the series of processes has been completed under the given condition by the functional blocks of the electronic control units and outputs a detection result.

2. The vehicle control system according to claim 1, wherein deliveries of the signals of the functional blocks are designed to be performed in a predetermined order, and the detector detects whether or not the deliveries of the signals have been performed in the predetermined order and outputs the detection result.

3. The vehicle control system according to claim 2, wherein a specific functional block or each of a plurality of specific functional blocks denoting a part of the functional blocks or all the functional blocks processes order check information received from one preceding functional block and outputs a signal including both the order check information processed and the result of the process to one succeeding functional block, each of the functional blocks other than the specific functional blocks outputs a signal including both the order check information received from one preceding functional block and the result of the process to one succeeding functional block, and the detector detects whether or not the deliveries of the signals of the specific functional blocks are performed out of the predetermined order according to the order check information of the signal outputted from one of the functional blocks.

4. The vehicle control system according to claim 3, wherein the order check information includes numeric data, and each specific functional block changes the numeric data of the received order check information by a predetermined value.

5. The vehicle control system according to claim 3, wherein the functional blocks including an intended functional block repeatedly execute the series of processes, the detector receives the order check information from the intended functional block for each series of processes, the detector calculates a difference between the order check information received in a preceding series of processes and the order check information received in a current series of processes, and the detector judges that the deliveries of the signals of the functional blocks are performed out of the predetermined order when the difference is not equal to a predetermined difference.

6. The vehicle control system according to claim 2, wherein a specific functional block or each of a plurality of specific functional blocks denoting a part of the functional blocks or all the functional blocks processes order check information received from one preceding functional block and outputs a signal including both the order check information processed and the result of the process to one succeeding functional block, each of the functional blocks other than the specific functional blocks outputs a signal including both order check information received from one preceding functional block and the result of the process to one succeeding functional block, and the detector calculates a difference between the order check information outputted from the functional block first delivering the signal in the predetermined order and the order check information outputted from the functional block delivering the signal at the last but one in the predetermined order and judges that the deliveries of the signals of the specific functional blocks are performed out of the predetermined order when the difference is not equal to a predetermined difference.

7. The vehicle control system according to claim 3, wherein the order check information has a plurality of flags, and each specific functional block sets one or more flags at a predetermined state.

8. The vehicle control system according to claim 3, wherein the specific functional blocks are classified into a plurality of groups, a difference between the received order check information and the processed order check information in the specific functional block(s) of each group differs from a difference between the received order check information and the processed order check information in the specific functional block(s) of each of the other group(s).

9. The vehicle control system according to claim 3, wherein the signal of the functional block first delivering in the predetermined order includes the order check information set at a starting state and the result of the process.

10. The vehicle control system according to claim 9, wherein the functional blocks repeatedly execute the series of processes, and the functional block first delivering the signal in the predetermined order gives a predetermined change to the order check information each time the functional block delivers the signal.

11. The vehicle control system according to claim 10, wherein the functional block first delivering the signal in the predetermined order comprises:
a storing part which produces starting information each time the functional block delivers the signal and stores the starting information in a recording medium;
a reading-out part which reads out the starting information stored in the recording medium by the storing part;
a setting part which sets the starting information read out by the reading-out part as the order check information set at the starting state;
an outputting part which outputs the order check information set by the setting part; and
a process part which executes a first part of the process during a time period between the storage of the starting information performed by the storing part and the reading of the starting information performed by the reading-out part and executes a second part of the process during a time period between the reading of the starting information performed by the reading-out part and the setting of the order check information performed by the setting part.

12. The vehicle control system according to claim 1, wherein the detector is arranged in one electronic control unit in which the last functional block is arranged.

13. The vehicle control system according to claim 1, wherein the detector is arranged in one electronic control unit in which the first functional block is arranged to control an actuator.

14. The vehicle control system according to claim 2, further comprising at least one second detector which detects whether or not the deliveries of the signals of the functional blocks are performed in the predetermined order and outputs a detection result, wherein the detector and the second detector(s) are arranged in the electronic control units different from one another, respectively.

15. The vehicle control system according to claim 3, wherein all the functional blocks including one specific functional block or one or more functional blocks including one specific functional block, respectively, execute a plurality of second processes determined by dividing a second type series of processes in the same manner as the processes for the series of processes, and
the specific functional block receives second order check information for the second type series of processes in addition to the order check information for the series of processes, processes one of the order check information and the second order check information corresponding to the series of processes and the second type series of processes required to be processed at a higher degree of reliability, and outputs the order check information or the second order check information processed.

16. The vehicle control system according to claim 2, wherein one electronic control unit has at least the two functional blocks, the detector judges that the electronic control unit is not correctly operated when the deliveries of the signals performed out of the predetermined order are caused by both the two functional blocks of the electronic control unit.

17. The vehicle control system according to claim 5, wherein the detector detects that the deliveries of the signals are performed out of the predetermined order according to the order check information of the signal outputted from the functional block at the last but one in the predetermined order.

18. The vehicle control system according to claim 7, wherein the flags of the order check information are respectively allocated to the specific functional blocks, each specific functional block sets the corresponding flag at the predetermined state, and the detector detects that the deliveries of the signals are performed out of the predetermined order when at least one of the flags is not set at the predetermined state.

19. The vehicle control system according to claim 3, further including:
a second functional block of one electronic control unit which executes a second process for a second type series of processes with the functional blocks or a part of the functional blocks in the same manner as the process for the series of processes,
wherein the order check information has a plurality of flags, respectively, allocated to the specific functional blocks and the second functional block, and the second functional block sets the corresponding flag of the order check information at a predetermined state in the second process and outputs a signal of both the order check information and a result of the second process.

20. The vehicle control system according to claim 3, wherein each of a plurality of particular functional blocks among the functional blocks first delivers the signal in a predetermined order, each of the signals of the particular functional blocks includes one piece of order check information set at a starting state and data of the result of the process, and one specific functional block receiving the signals of the particular functional blocks outputs a signal including the pieces of order check information processed and pieces of processed data based on the pieces of received data to the succeeding functional block.

21. The vehicle control system according to claim 3, wherein each of a first particular functional block and a second particular functional block among the functional blocks first delivers the signal in a predetermined order, a degree of reliability required of the result of the process of the first particular functional block is higher than that required of the result of the process of the second particular functional block, the signal of the first particular functional block includes the order check information and first data of the result of the process, the signal of the second particular functional block includes second order check information and second data of the result of the process, and one specific functional block receiving the signals of the particular functional blocks outputs a signal including the order check information processed, first processed data based on the first data and second processed data based on the second data.

22. The vehicle control system according to claim 1, wherein the deliveries of the signals among the functional blocks of one of the electronic control units are designed to be performed in a predetermined order to perform a part of the series of processes in the electronic control unit, and the detector detects whether or not the deliveries of the signals among the functional blocks of the electronic control unit have been executed in the predetermined order and outputs the detection result.

23. A vehicle control system, comprising:
a plurality of electronic control units which repeatedly execute a series of processes to control a vehicle, each series of processes being allocated to the electronic control units, each of the electronic control units executing one of the processes for each series of processes and outputting a signal in communication using a communication line, a first one of the electronic control units in execution of each series of processes receiving an input and outputting the signal including check data and a result of the process using the input, each of the electronic control units subsequent to the first one renewing the check data so as to indicate completion of execution of the process in the check data, executing the process using the signal delivered by a preceding one of the functional blocks and outputting the signal including both the check data renewed and a result of the process, a last one of the electronic control units in the execution of each series of processes outputting the signal for use in vehicle control, and deliveries of the signals among the electronic control units being designed to be performed in a predetermined order for each series of processes; and
an order check unit, arranged in one of the electronic control units, which compares the check data delivered to the electronic control unit in a current series of processes with the check data delivered to the electronic control unit in a series of processes preceding to the current series of processes, judges according to a comparison result whether or not the deliveries of the signals of the electronic control units have been performed in the predetermined order and outputs a judgment result.

24. The vehicle control system according to claim 23, wherein the order check unit detects a difference between the check data for the current series of processes and the check data for the preceding series of processes and judges that the deliveries of the signals of the electronic control units are performed out of the predetermined order when the detected difference is not equal to a predetermined difference.

* * * * *